United States Patent [19]
Amakawa et al.

[11] Patent Number: 6,016,485
[45] Date of Patent: Jan. 18, 2000

[54] SYSTEM FOR PATHFINDING

[75] Inventors: Koji Amakawa, San Jose; Edward Joseph Suranyi, Union City, both of Calif.

[73] Assignee: Etak, Inc., Menlo Park, Calif.

[21] Appl. No.: 09/023,504

[22] Filed: Feb. 13, 1998

[51] Int. Cl.$^7$ ................................................ G06F 17/00
[52] U.S. Cl. .......................... 705/400; 701/202; 701/201
[58] Field of Search .................................... 340/989, 990,
340/995; 364/400; 370/254, 255, 256, 351;
395/200.71; 701/25, 26, 201, 202; 705/400;
709/241; 700/90

[56] References Cited

U.S. PATENT DOCUMENTS

| | | | |
|---|---|---|---|
| 4,796,191 | 1/1989 | Honey et al. | 701/217 |
| 4,914,605 | 4/1990 | Loughmiller, Jr. et al. | 345/432 |
| 4,984,168 | 1/1991 | Neukrichner et al. | 701/210 |
| 5,031,093 | 7/1991 | Hasegawa | 395/200.71 |
| 5,168,452 | 12/1992 | Yamada et al. | 701/202 |
| 5,170,353 | 12/1992 | Verstraete | 701/202 |
| 5,285,391 | 2/1994 | Smith, Jr. et al. | 701/200 |
| 5,311,195 | 5/1994 | Mathis et al. | 342/357 |
| 5,369,588 | 11/1994 | Hayami et al. | 701/209 |
| 5,475,598 | 12/1995 | Fushimi et al. | 701/202 |
| 5,486,822 | 1/1996 | Tenmoku et al. | 340/995 |
| 5,495,479 | 2/1996 | Galaand et al. | 370/404 |
| 5,502,640 | 3/1996 | Yagyu et al. | 701/200 |
| 5,513,110 | 4/1996 | Fujita et al. | 701/207 |
| 5,521,910 | 5/1996 | Matthews | 370/256 |
| 5,557,552 | 9/1996 | Nakayama et al. | 701/200 |
| 5,600,638 | 2/1997 | Bertin et al. | 370/351 |
| 5,706,503 | 1/1998 | Poppen et al. | 707/100 |
| 5,729,458 | 3/1998 | Poppen | 705/400 |
| 5,845,228 | 12/1998 | Uekawa et al. | 701/209 |
| 5,890,081 | 3/1999 | Sasaki | 701/37 |
| 5,893,081 | 4/1999 | Poppen | 705/400 |
| 5,916,299 | 6/1999 | Poppen | 701/202 |

*Primary Examiner*—Edward R. Cosimano
*Attorney, Agent, or Firm*—Fliesler, Dubb, Meyer & Lovejoy LLP

[57] ABSTRACT

A system is disclosed for determining a path in a network that decreases the number of disk accesses needed during the pathfinding computation. The network is divided in to a set of tiles. Certain sub-paths are pre-computed. The pre-computed sub-paths are grouped into webs. When finding a path, the system will perform a pathfinding exploration within the tile for the origin and a pathfinding exploration within the tile for the destination. A number of the webs will be used with the two explorations to determine a path from the origin to the destination.

49 Claims, 10 Drawing Sheets

SYSTEM FOR PATHFINDING

BACKGROUND OF THE INVENTION

1. Field of the Invention

The present invention is directed to a system for pathfinding.

2. Description of the Related Art

Computers have revolutionized the idea of modeling systems for enhanced study and use of the systems. One example is the modeling of a system as a network. A network is defined in its most general sense as something that includes a number of paths that interconnect or branch out. Many systems that involve decisions can be modeled as a network. For example, a manufacturing process or a system for providing medical treatment can be modeled as a network of decision points and actions between decision points. This network can be represented in electronic form and stored on a processor readable storage medium so that software can be created for using the network model to study or use the system.

Another example of a useful network that can be stored in electronic form is the electronic map, which includes geographically referenced electronic data quantifying a physical, social or economic system. The range of information included in electronic maps is unlimited. For example, an electronic map of roads could include distances between elements, travel time, lot numbers, tax information, tourist information, processing time, waiting time, etc. Additionally, storing a map as a file on a computer allows for unlimited software applications to manipulate that data.

One advantage of the electronic map is that it can store and determine costs associated with various portions of a map. A cost is a variable that can be minimized or maximized. Note that the costs are not necessarily monetary costs. Typically costs are represented as integers. Sometimes costs can be represented as real numbers or non-standard numbers. Additional information about costs and non-standard numbers can be found in U.S. patent application Ser. No. 08/756,263, "Using Multiple Levels Of Costs For A Pathfinding Computation," filed Nov. 25, 1996, now issued as U.S. Pat. No. 5,890,081 incorporated herein by reference. Examples of costs include time, distance, tolls paid, ease of turning, quality of scenery, etc.

Electronic maps, as well as other networks, can also be used for pathfinding, which is a method for computing a route between an origin and a destination. Some systems compute recommended routes and guide the driver by highlighting the recommended route on a map display, or by giving turn-by-turn directions (via paper or display), or both.

When a pathfinding system is computing a recommended route to a destination, it does so by finding the most desirable route according to certain specified criteria. These criteria may be specified by the driver, or may be set as defaults at the time of manufacture. Often, a system will be used to find a path that minimizes (or maximizes) some cost, for example, driving time.

An electronic map that is used for pathfinding must carry information about the connectivity of a road network, that is, information about the ways in which pieces of road do or do not connect to each other, for example, where there are ordinary intersections, where there are overpasses, where turns are restricted, and so on. For an area of any significant extent, this is a very large amount of information. An electronic map can include tens or hundreds of megabytes of data. In order to hold such vast quantities of data economically and allow a user to replace maps with updated copies easily, many current pathfinding apparatus (which includes general purpose computers with pathfinding software, automotive navigation systems or other map application equipment) use CD-ROMs to store the electronic map data.

Although CD-ROMs hold a great deal of data, accessing that data can be relatively slow. If a pathfinding system has to wait for a CD-ROM to be accessed every time it needs data, the time needed to compute a path becomes unacceptable to a user. A user of a navigational pathfinding system stored in a car typically would demand very fast response times when requesting a path because a user currently driving needs to know which way to turn. For these reasons, it is very important to minimize the number of disk accesses required to compute a path. It is noted that some systems may use peripheral devices other than CD-ROMs, for example, hard disks, floppy disks, solid state memory, DVD, mini disks, etc. These other storage devices suffer similar access time limitations.

One attempt to minimize the number of disk accesses required to compute a path includes grouping map data into clusters, that is, grouping together on a CD-ROM (or other storage device) information about sets of road segments often used in the same path computation. For example, a number of consecutive segments of the same street, road segments that cross each other or road segments that lead to a highway may be stored in a single cluster. Note that these clusters need not be geographically based. Information about roads on two sides of a river in an area that is not close to a bridge would probably not be stored in the same cluster, since the roads would not be used in relation to each other during path calculation even though they may be quite close to each other geographically. Information about highways over a wide area are good candidates to be stored together in one cluster because a path computation typically explores the connections of highways with other highways. There are many ways to cluster data to increase performance. When clustering is used with a suitable cache methodology, the time for pathfinding is saved because information needed by the pathfinding computation is often already in the cache having been read as part of a cluster which includes data already used. More information about using a cache strategy can be found in U.S. patent application Ser. No. 08/802,733, "Caching For Pathfinding Computation," filed Feb. 20, 1997, incorporated herein by reference.

Pathfinding remains a lengthy process even when using a cache. Every cluster used in the computation still needs to be read at least once. Since the pathfinding computation may need to read a large number of clusters at the beginning of and during the pathfinding computation, the user of the pathfinding apparatus still spends a significant amount of time waiting for the pathfinding apparatus to read all the data prior to a path being calculated.

Another attempt to speed up the pathfinding process is to pre-compute certain paths in a network or map. To find a path from an origin to a destination, a system would pick an appropriate pre-computed path, find a path from the origin to the pre-computed path, and find a path from the pre-computed path to the destination. More discussion about using pre-computed paths can be found in U.S. patent application Ser. No. 08/756,258, "Method For Determining Exits and Entrances For A Region In A Network," filed Nov. 25, 1996, now issued as U.S. Pat. No. 5,916,299, incorporated herein by reference. Although using a pre-computed path will speed up a pathfinding process, a lot of processing time is still used to find a path from an origin to the pre-computed path and from the pre-computed path to a destination.

Therefore, a system is needed that reduces the amount of time needed to perform a pathfinding process.

SUMMARY OF THE INVENTION

The present invention, roughly described, provides for a system for determining a path in a processor readable representation of a network. The path is from an origin to a destination. The network and/or the processor readable representation of the network includes one or more tiles. A method for calculating the path includes determining whether the origin and the destination are located in a single tile and/or determining whether the origin and the destination are located in tiles within a proximity threshold of each other. A first path exploration is performed, using a processor, to determine the path using an origin tile and a first self web associated with the origin tile. The first path exploration is only performed if the origin and destination are located in a single tile. A second path exploration is performed, using a processor, to determine the path using the origin tile, the first self web, a destination tile, a second self web associated with the destination tile and a too-close web. The second path exploration is only performed if the origin and destination are located in separate tiles and the separate tiles are within a proximity threshold of each other. A third pathfinding exploration is performed, using a processor, to determine the path using the origin tile, the first self web, a first vicinity web associated with the origin tile, the destination tile, the second self web, a second vicinity web associated with the destination tile and an exit-to-entrance web. The third path exploration is only performed if the origin and destination are located in separate tiles that are not within the proximity threshold of each other. Although three pathfinding explorations are mentioned, finding a particular path from an origin to a destination generally requires only performing one of the three pathfinding explorations. After a path is determined, the system reports the path. Reporting the path could include providing turn-by-turn directions or highlighting a route on a map. The reporting can be on a display or on paper. Reporting could also include providing the path or directions as an audio output, providing a file to another process, providing a pointer to a file, providing information to another processor or computer, or any other suitable method for reporting.

By using the appropriate webs and tiles, the time needed to compute a path (including time to access data) is reduced significantly.

The present invention can be implemented using software, hardware, or a combination of software and hardware. When all or portions of the present invention are implemented in software, that software can reside on processor readable storage medium. Examples of appropriate processor readable storage medium include one or more floppy disks, hard disks, CD ROMs, memory IC's, etc. When the system includes hardware, the hardware may include an output device (e.g. a monitor), an input device (e.g. a keyboard or pointing device) a processor in communication with the output device and processor readable storage medium in communication with the processor. The processor readable storage medium stores code capable of programming the processor to perform the steps to implement the present invention. The pathfinding process of the present invention can also be implemented in a web page on the Internet or on a server that communicates to a plurality of client machines.

These and other objects and advantages of the invention will appear more clearly from the following detailed description in which the preferred embodiment of the invention has been set forth in conjunction with the drawings.

DETAILED DESCRIPTION

The system for finding a path may be implemented in hardware and/or software. In one implementation, the system for finding a path may comprise a dedicated processor including processor instructions for performing the functions described herein. Circuits may also be developed to perform the functions described herein. In one embodiment, the system for finding a path is part of a pathfinding system. The pathfinding system can be a general purpose computer with pathfinding software or a navigation system. Examples of navigation systems are described in U.S. Pat. No. 4,796,191, Vehicle Navigation System and Method; U.S. Pat. No. 4,914,605, Map Display Apparatus and Method; U.S. Pat. No. 5,311,195, Combined Relative and Absolute Positioning Method and Apparatus; and U.S. Pat. No. 5,948,043, Navigation System Using GPS Data, all of which are incorporated herein by reference. In another implementation, the system for finding a path includes a plurality of computer executable instructions for implementation on a general purpose computer system. Prior to loading into a general purpose computer system, the software may reside as encoded information on a computer readable medium, such as a magnetic floppy disk, magnetic tape, and compact disc read only memory (CD-ROM).

Figure 1:
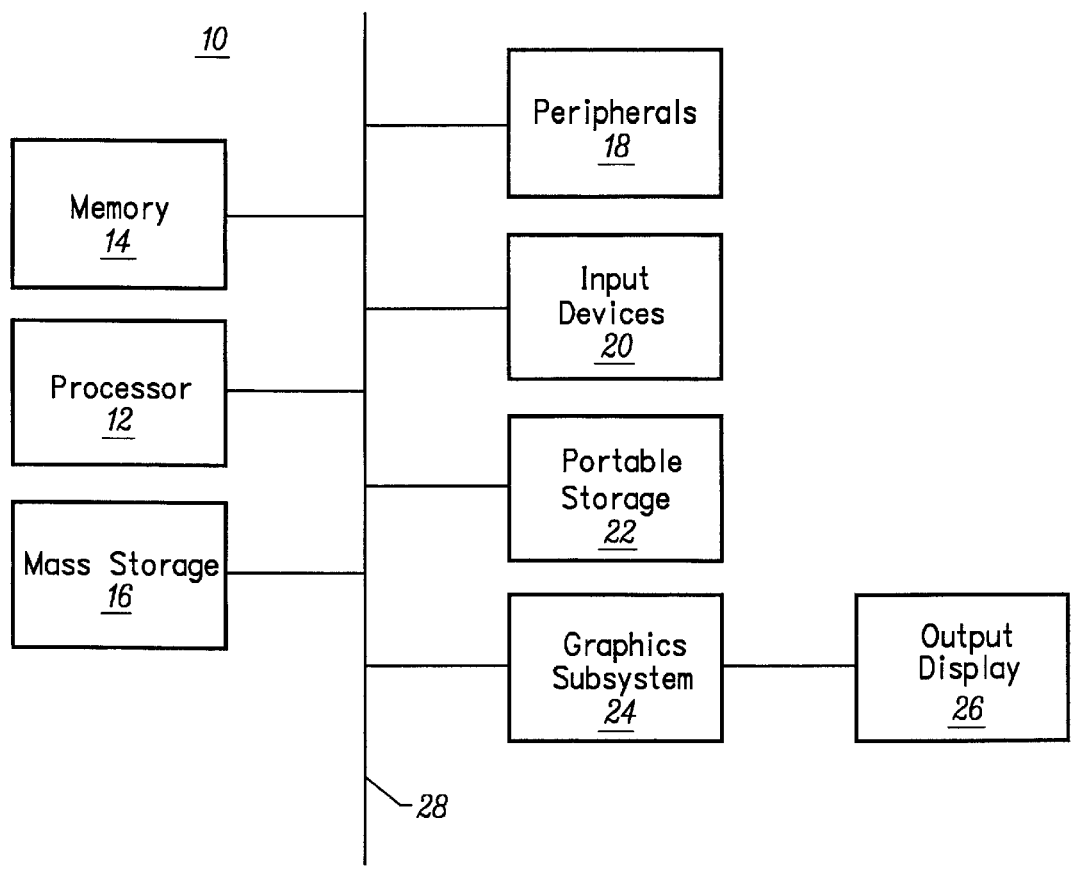
FIG. 1 is a block diagram of one exemplar hardware architecture that can be used to practice the present invention.

FIG. 1 illustrates a high level block diagram of a general purpose computer system in which the system for finding a path of the present invention may be implemented. A computer system 10 contains a processor unit 12 and main memory 14. Processor unit 12 may contain a single microprocessor, or may contain a plurality of microprocessors for configuring the computer system 10 as a multi-processor system. Main memory 14 stores, in part, instructions and data for execution by processor unit 12. If the system for finding a path of the present invention is wholly or partially implemented in software, main memory 14 stores the executable code when in operation. Main memory 14 may include banks of dynamic random access memory (DRAM) as well as high speed cache memory.

Computer system 10 further includes a mass storage device 16, peripheral device(s) 18, input device(s) 20, portable storage medium drive(s) 22, a graphics subsystem 24 and an output display 26. For purposes of simplicity, the components in computer system 10 are shown in FIG. 1 as being connected via a single bus 28. However, computer system 10 may be connected through one or more data transport means. For example, processor unit 12 and main memory 14 may be connected via a local microprocessor bus, and the mass storage device 16, peripheral device(s) 18, portable storage medium drive(s) 22, graphics subsystem 24 may be connected via one or more input/output (I/O) buses. Mass storage device 16, which may be implemented with a magnetic disk drive or an optical disk drive, is a non-volatile storage device for storing data and instructions for use by processor unit 12. In one embodiment, mass storage device 16 stores the system software for determining a path for purposes of loading to main memory 14.

Portable storage medium drive 22 operates in conjunction with a portable non-volatile storage medium, such as a floppy disk, to input and output data and code to and from computer system 10. In one embodiment, the system software for determining a path is stored on such a portable medium, and is input to the computer system 10 via the portable storage medium drive 22. Peripheral device(s) 18 may include any type of computer support device, such as an input/output (I/O) interface, to add additional functionality to the computer system 10. For example, peripheral device (s) 18 may include a network interface card for interfacing computer system 10 to a network, a modem, etc.

Input device(s) 20 provide a portion of the user interface for a user of computer system 10. Input device(s) 20 may include an alpha-numeric keypad for inputting alpha-numeric and other key information, or a cursor control device, such as a mouse, a trackball, stylus, or cursor direction keys. In order to display textual and graphical information, computer system 10 contains graphics subsystem 24 and the output display 26. Output display 26 may include a cathode ray tube (CRT) display, liquid crystal display (LCD) or other suitable display device. Graphics subsystem 24 receives textual and graphical information, and processes the information for output to output display 26. Output display 26 can be used to report the results of a pathfinding determination. The components contained in computer system 10 are those typically found in general purpose computer systems, and are intended to represent a broad category of such computer components that are well known in the art. The system of FIG. 1 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and so on.

The present invention is directed to a system for finding a path in a network. One example of a network suitable for use with the present invention is an electronic map of roads. For example purposes only, the present invention will be discussed with reference to an electronic map. The present invention is in no way limited to use with electronic maps, and embodiments of the present invention may be used with any type of processor readable representation of a network.

An electronic map of roads is stored in one or more computer files which include the data necessary to construct a map. This data could include longitude and latitude data, addresses, distances, road information, turning restrictions, driving times, highway exit numbers, descriptions of commercial uses of properties, etc. Although the above listed information can be found in an electronic map, it is possible to create an electronic map with only a subset of the above listed information or with other information. The computer files representing an electronic map are stored on a processor readable storage medium.

Generally, an electronic map to be used for pathfinding includes a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph in which each edge has a single direction associated with it. There may be two edges between a given pair of nodes, one in each direction. In a directed graph, edges are referred to as links. A weighted graph is a graph in which each link (or edge) has a cost associated with it. Alternatives includes associating the costs with the nodes, with the nodes and links, or associating costs with another element of the graph. An undirected graph is a graph where each link is bidirectional. An undirected graph can be thought of as a directed graph where each link represents two links with the same end points but different directions.

Figure 2A:
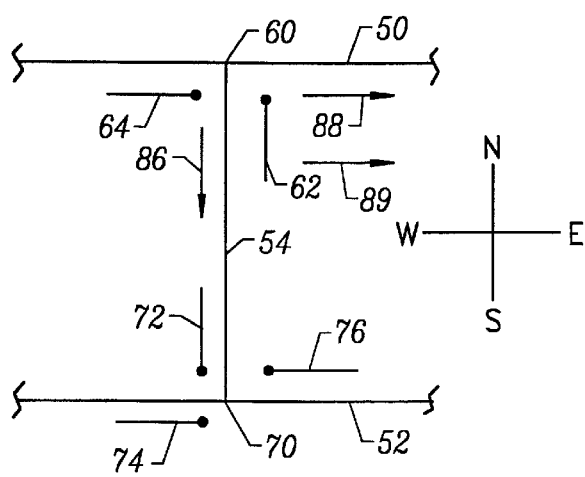
FIG. 2A is an example of a directed graph representing a part of an electronic map.

FIG. 2A shows an exemplar directed graph which shows eastbound one-way street 50 and two-way street 52, both intersecting with two-way street 54. Street 50 intersects with street 54 at intersection 60. Street 52 intersects with street 54 at intersection 70. At intersection 60 are two nodes, 62 and 64. The head of the node is a circle. The rear of the node is a straight-line tail. The circle represents where the node is located and the tail represents where a traveler would come from to reach that node. The node symbol is displaced from the actual intersection for purposes of visibility. For example, node 62 represents travel northbound on street 54 toward intersection 60. Node 64 represents travel eastbound on road 50 toward intersection 60. There is no node at intersection 60 to represent westbound travel on street 50 because street 50 is an eastbound one-way street. Thus, a traveler proceeding north on road 54 and reaching intersection 60 can only make a right turn. Node 72 represents arriving at intersection 70 by traveling south on street 54. Node 74 represents arriving at intersection 70 by traveling east on road 52. Node 76 represents arriving at intersection 70 by traveling west on road 52.

Links represent a path between nodes. For example, from node 64 a traveler can make a right turn at intersection 60 to enter road 54 or can proceed straight on road 50. Link 86 represents travel starting from intersection 60 on road 50 facing east, making a right turn at intersection 60 and proceeding south on road 54. Thus, link 86 connects node 64 to node 72. Link 88 connects node 64 to the next node on street 50 (not shown on FIG. 2A) and represents travel east along road 50, proceeding straight through intersection 60 without turning. Link 89 represents travel starting from intersection 60 on road 54 facing north, making a right turn at intersection 60 and proceeding east on road 50; therefore, link 89 connects node 62 to the next node on street 50 (not shown on FIG. 2A). FIG. 2A only shows links drawn for nodes 62 and 64. If links are drawn for all nodes, the directed graph would become too crowded and would be difficult to read. Thus, the directed graph is simplified and redrawn as in FIG. 2B.

Figure 2B:
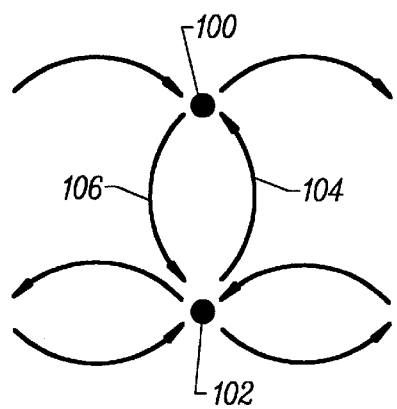
FIG. 2B is a second example of a directed graph representing a part of an electronic map.

In FIG. 2B, all the nodes at the same intersection are collapsed into one node to make the following explanation simpler. (In actual use, the present invention can make use of a graph similar to FIG. 2A or FIG. 2B.) Thus, node 100 represents nodes 64 and 62. Node 102 represents nodes 72, 74 and 76. Note that the tails of the nodes are not drawn. The links are used to indicate directions of allowable travel. Link 104 indicates travel from intersection 70 to intersection 60 and link 106 indicates travel from intersection 60 to intersection 70.

The directed graph of FIG. 2B is used to symbolically understand the data structure stored in a processor readable storage medium. A processor readable storage medium does not actually store an image of a directed graph. Rather, a data structure is stored. Each entry in the data structure represents a node. For each node, the data structure stores the location of the node (e.g., latitude and longitude), a list of neighboring nodes (nodes which can be traveled to via one link) and the various costs associated with getting to the neighboring nodes. It is contemplated that the present invention will work with many suitable data structures different from the one described. Furthermore, the invention need not be used with a directed graph. The present invention can be used with the entire map database, other networks, or any other suitable subset of information. Furthermore, one or more entries in a data structure can be grouped together in a cluster of data. A cluster of data is a grouping of related data. Although clusters improve performance, the present invention can be used without clusters.

Figure 3:
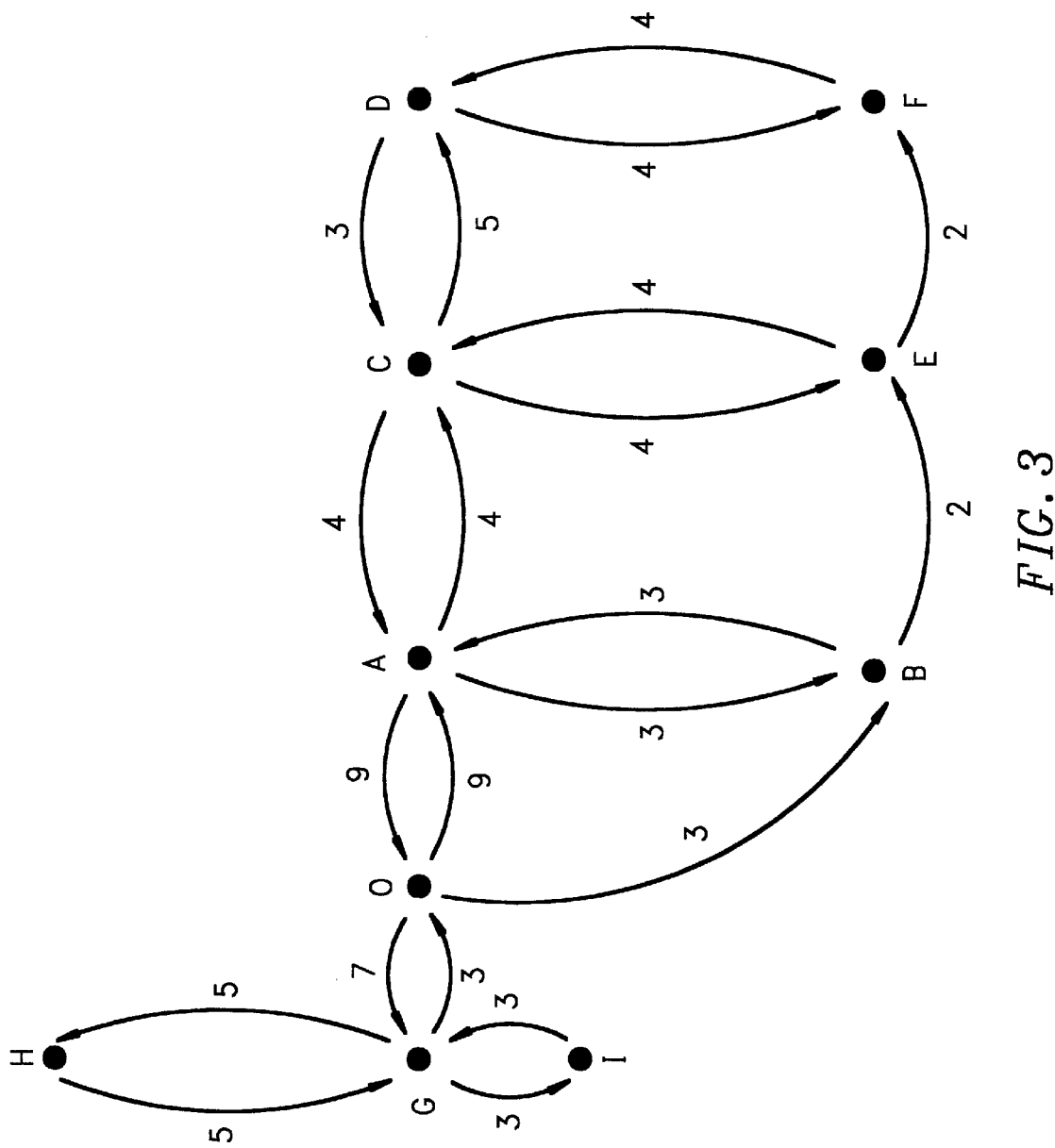
FIG. 3 is an example of a network.

FIG. 3 represents a directed graph for a portion of a processor readable representation of a network, such as an electronic map. The directed graph depicted in FIG. 3 includes ten nodes (A, B, C, D, E, F, G, H, I, and O) and various links between the nodes. Each of the links include a number adjacent to the link. This number represents the cost of traveling along that link. For exemplar purposes only, the cost is assumed to be driving time. To help explain the current invention it is assumed that a driver in a car has an automotive navigation system in the car that performs pathfinding. The driver is located somewhere in the directed graph of FIG. 3 and at some point may decide to ask the navigation system to compute a path from one location to another. To explain how a path is computed, it is assumed that the driver has asked the system to compute a path from the origin O to the destination D. At the time the driver asked for the path the driver may have been at origin O, may be at another location in the graph driving toward origin O, or may be nowhere near origin O but still interested in the path.

Figure 4:
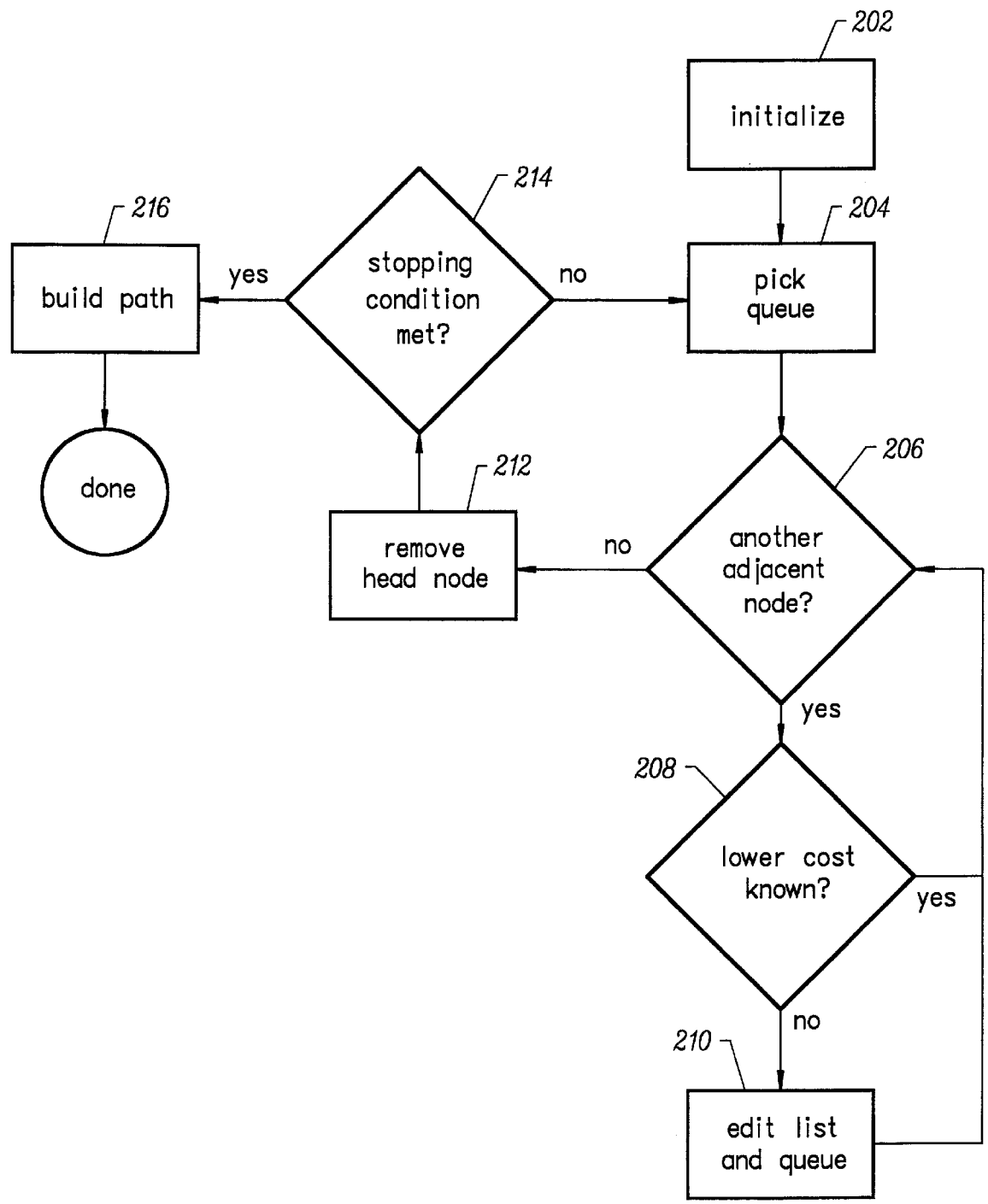
FIG. 4 is a flow chart describing a first method for performing a pathfinding exploration.

FIG. 4 is a flow chart which explains a pathfinding exploration. The pathfinding exploration of FIG. 4 is only one of many exploration methods that can be used with the present invention. In step 202 the system initializes the pathfinding exploration. That is, the system stores the origin and destination of the path and sets up two queues: an origin priority queue and a destination priority queue. The origin priority queue consists of an ordered list of nodes, to each of which a path from the origin is known, and a key for each node. The queue is sorted according to the key. There are various alternatives for determining the key. In one alternative, the key is the lowest known cost of traveling from the origin to the node. An alternative key includes the sum of the known lowest cost from the origin to the node plus an estimated cost of traveling from the node to the destination. There are various alternatives for estimating the cost for traveling from the node to the destination which are suitable for this method. One example includes multiplying the direct "as-the-crow-flies" distance by the estimated cost per unit distance. That is, disregarding the nodes and links, determining the physical distance between the node and the destination and multiplying that distance by an estimated cost per unit distance.

The destination priority queue consists of an ordered list of nodes, from each of which a path to the destination is known, and a key for each node. The queue is sorted according to the key. There are many alternatives for determining a destination key. One alternative includes using the known lowest cost path from the node to the destination. An alternative key includes using the sum of the known lowest cost from the node to the destination plus an estimated cost from the origin to the node. The key described above for the origin priority queue which utilizes the estimated remaining costs produces an exploration from the origin that is biased in the direction of the destination. Similarly, an exploration from the destination is biased in the direction of the origin. Other methods of computing a key are suitable within the scope of the present invention.

Additionally, the system sets up an origin visited list and a destination visited list. The origin visited list maintains a list of all nodes to which paths from the origin are known, the lowest cost for traveling from the origin to the node, and the previous node along the path with that lowest cost. The destination visited list stores the name of each node for which paths to the destination are known, the known lowest cost for traveling from the node to the destination, and the identity of the next node along the path to the destination with that lowest cost. After the initialization step 202 is completed, the origin priority queue and the origin visited list include the origin, and the destination priority queue and the destination visited list include the destination.

Once the system is initialized, the system chooses a queue according to a rule in step 204. There are many rules of picking a queue which are suitable for the present invention. In one system, the queue containing the element with the smallest key is chosen, with ties broken arbitrarily. In another system, the queue containing the least amount of elements is chosen. Other examples of rules for choosing a queue include alternating between queues; or choosing the origin queue for a certain number of iterations (or a time period), switching to the destination queue for a certain number of iterations, switching back to the origin queue for a certain number of iterations, etc. Since the queues are sorted by keys, the node with the smallest key will be at the head of the queue (also called the front or the top of the queue). This node is called the "head node." In the example discussed below, the method for picking a queue will be to alternate starting with the origin priority queue.

In step 206, the system looks for all nodes which are adjacent nodes to the head node of the chosen queue. Since the system has just started, the only node in the origin priority queue is the origin. The adjacent nodes are those nodes which can be traveled to from the origin without going through any other nodes. With respect to FIG. 3, the adjacent nodes for the origin O are nodes A, B and G. Since there are three adjacent nodes, the system arbitrarily picks one adjacent node. In step 208, the system determines whether there is a lower cost known on the visited list or the priority queue for the adjacent node picked. That is, the system determines the cost of traveling between the adjacent node and the head node and adds that cost to the cost already known for the head node. In this case, the adjacent node picked is node A and the cost of traveling from the origin to node A is 9. Since the pathfinding computation has just started, node A is not on the visited list or the origin priority queue so there is no known cost. Since there is no known cost, in step 210 the system edits the visited list and the priority queue to add node A and its cost. The method loops back to step 206 to determine whether any additional adjacent nodes have not been considered. In this case there are two adjacent nodes that have not been considered: B and G.

In step 208, the system determines whether there is a lower cost known for node B. If there is a lower cost known, the method loops to step 206. The cost for traveling from origin to B is 3 and B does not appear on the priority queue or the visited list. In step 210, node B is added to the priority queue and the visited list. The system loops back to step 206 and considers node G, since there is no known cost lower than the cost of going directly from the origin O to G, which is 7, G is added to the priority queue and the visited list. The system loops back to step 206 and determines that there are no adjacent nodes; therefore, in step 212 the head node, which is currently the origin, is removed from the priority queue. Table 1 reflects the contents of the origin priority queue and the visited list at this point in the pathfinding exploration. There are three nodes on the origin priority queue: B, G and A. Their keys represent the cost of traveling from the origin to that node. The visited list has three columns: Node, Cost and Prev. The node column lists the node identification, the cost column lists the lowest known cost of traveling from the origin to that node and the Prev column lists the previous node along the path from the origin to the listed node when traveling along the path utilizing the lowest known cost. The order that the nodes are listed in the visited list can be any order that makes it easy to search the list. For example, the nodes can be listed in alphabetical order. In one implementation, the nodes are named by numerical codes and the visited list is a hash table.

TABLE 1

| Origin Priority Queue | | Origin Visited List | | |
|---|---|---|---|---|
| Node | Key | Node | Cost | Prev |
| B | 3 | A | 9 | O |
| G | 7 | B | 3 | O |
| A | 9 | G | 7 | O |
| | | O | 0 | — |

In step 214, the system determines whether a stopping condition has occurred. There are many stopping conditions which are suitable for the present invention, for example, stopping when a node has been the head node on both the origin priority queue and the destination priority queue. Another stopping condition, which is the stopping condition used in this example, is stopping when the cost of traveling from the origin to the head node in the origin priority queue plus the cost of traveling from the head node of the destination priority queue to the destination is greater than or equal to the total cost of the best connection node. A connection node is the node that appears on the destination visited list and the origin visited list. Total cost of a connection node is the cost from the origin to the connection node plus the cost from the connection node to the destination. The best connection node is the connection node with the lowest total cost. In the present case there is no connection nodes so the stopping condition fails and, in step 204, the system picks a queue.

As discussed above, the queue selection algorithm in the present example is alternating; therefore, the system picks the destination queue. In step 206, the system determines whether there are any nodes adjacent to the destination D. In the present example there are two adjacent nodes C and F. In step 208, the system looks at node C and determines whether there is a lower known cost. Since there is not, in step 210 the destination priority queue and visited list are edited to add node C and its cost. The method loops back to step 206 which determines that there is another adjacent node, node F. In step 208, the system determines that there is not a lower known cost known for F. In step 210, the destination priority queue and the destination visited list are edited to add node F. In step 206, the system determines there are no more adjacent nodes to node D and node D is removed from the destination priority queue in step 212. Table 2 reflects the state of the destination priority queue and visited list at this point in the method. The column labeled Next lists the next node along the path from the listed node to the destination when traveling along the path utilizing the lowest cost known.

TABLE 2

| Dest. Priority Queue | | Dest. Visited List | | |
|---|---|---|---|---|
| Node | Key | Node | Cost | Next |
| F | 4 | C | 5 | D |
| C | 5 | D | 0 | — |
| | | F | 4 | D |

Since there are no connection nodes, the stopping condition fails (step 214) and the system picks the origin priority queue (step 204). From Table 1, it can be seen that the head node on the origin priority queue is node B. The adjacent nodes to node B are nodes A and E. In step 208, there is not a lower known cost for node A. Although node A does appear on the visited list with a cost of 9, the cost of traveling from the origin to node A via node B is 6. That is, the cost of traveling from O to B is 3 and the cost of traveling from B to A is 3. Thus, the cost of traveling from O to B to A is 6 which is lower than the cost of traveling from O directly to A. Therefore, in step 210 the visited list and priority queue are edited so that the cost of traveling to node A is 6 and the previous node in the visited list for node A is B. That is, to get to A from O at a cost of 6 you must travel through node B. In step 206, the system determines that there is another adjacent node, E. In step 208, the system determines that there is not a lower known cost for E and the priority queue and visited list are edited to include E. Table 3 reflects the current state of the origin priority queue and the visited list after node B was removed from the priority queue (step 212).

TABLE 3

| Origin Priority Queue | | Origin Visited List | | |
|---|---|---|---|---|
| Node | Key | Node | Cost | Prev |
| E | 5 | A | 6 | B |
| A | 6 | B | 3 | O |
| G | 7 | E | 5 | B |
| | | G | 7 | O |
| | | O | 0 | — |

At this point, the stopping condition fails because there is no connection node and the system picks the destination queue (step 204). In step 206, the system looks for nodes adjacent to the head node on the destination queue. Since the head node is node F, the adjacent nodes are nodes E and D.

The cost of traveling from E to F is 2, thus, the cost traveling from E to F to D is 6. In step 208, the system determines that there is not a lower known cost for traveling from E to D so the visited list and priority queue are updated accordingly. The cost of traveling from D to F to D is eight which is more than the cost of zero associated with Node D in the visited list, so the visited lot and priority queue are not updated. In step 206, the system determines that there is not another adjacent node and F is removed from the priority queue in step 212. Table 4 reflects the state of the destination priority queue and visited list at this point in the method.

TABLE 4

| Dest. Priority Queue | | Dest. Visited List | | |
|---|---|---|---|---|
| Node | Key | Node | Cost | Next |
| C | 5 | C | 5 | D |
| E | 6 | D | 0 | — |
| | | E | 6 | F |
| | | F | 4 | D |

In step 214, the system determines whether the stopping condition has been met. At this point there is a connection node. Node E is on the visited list for the origin and the visited list for the destination. The total cost for node E is 11. That is, the cost from traveling from the origin to node E is 5 and from node E to the destination is 6. The stopping condition is not met because the cost of traveling from the origin to the head node in the origin priority queue (E) is 5 and the cost of traveling from the head node of the destination priority queue C to the destination is also 5. The sum of the two costs is 10 which is lower than the total cost for the connection node which is 11, therefore the stopping condition fails and the system picks the origin priority queue in step 204.

The head node in the origin priority queue is node E, which has two adjacent nodes: C and F. In step 208, the system determines whether a lower cost for traveling from the origin to F is already known. Since F is not on the origin priority queue, there is no known cost and the cost of traveling from the origin to E to F, which is 7, is added to the origin priority queue and the visited list. In step 206, the system determines that there is another adjacent node C. In step 208, the system determines whether there is a known cost for traveling to C from the origin. The cost of traveling from the origin to E to C is 9. Since there is no known lower cost from traveling from the origin to C, C is added to the priority queue and the visited list. At this point there are no more adjacent nodes to node E and node E is removed from the queue (step 212). Table 5 reflects the current state of the origin priority queue at this point in the method.

TABLE 5

| Origin Priority Queue | | Origin Visited List | | |
|---|---|---|---|---|
| Node | Key | Node | Cost | Prev |
| A | 6 | A | 6 | B |
| G | 7 | B | 3 | O |
| F | 7 | C | 9 | E |
| C | 9 | E | 5 | B |
| | | F | 7 | E |
| | | G | 7 | O |
| | | O | 0 | — |

In Step 214, the system determines that the stopping condition has been met. At this point there are three connection nodes. The total cost of connection node C is 14, the total cost of connection node F is 11 and the total cost of connect ion node E is 11. Since nodes E and F have the lowest total costs of all the connection nodes, nodes E and F are considered the best connection nodes. Various alternatives within the scope of the present invention may utilize other definitions of "best connection node." The cost of traveling from the origin to the head node on the origin priority queue is 6. The cost of traveling from the head node of the destination priority queue to the destination is 5. Therefore, the cost of traveling to and from the head nodes is eleven, which is equal to the total cost of the best cost connection node, which is also eleven. Thus, the stopping condition is met and the system builds the path in step 216.

The step of building the path is as follows. A rule selects some connection node. One such rule is to choose the best connection node. The selected connection node K is looked up in the origin visited list and the previous node $P_1$ on the path from the origin is found. If $P_1$ is not the origin, then $P_1$ is looked up in the visited list and the previous node $P_2$ is found. This continues until the origin is reached. Suppose the origin is reached as node $P_L$. Similarly, K is looked up in the destination visited list and the next node $N_1$ is found. If $N_1$ is not the destination, then $N_1$ is looked up in the visited list This continues until the destination is reached. Suppose the destination is reached as node $N_M$. At this point the path from the origin to the destination is known: it is the path from $P_L$ (the origin) to $P_{L-1}$, to $P_{L-2}$, ..., to $P_2$, to $P_1$, to K, to $N_1$, ..., to $N_{M-1}$, to $N_M$ (the destination).

In the present example, nodes E and F were both the best connection nodes. The system arbitrarily picks node E. Looking at the visited list in Table 5, the best known cost of traveling from the origin to node E involves traveling from node B to node E. Thus, the path being built will travel from B to E. The system then finds node B in the visited list and determines that the best path to node B is directly from the origin O. At this point the path built includes traveling from O to B to E. After the system reaches the origin, the system builds a path from the connection node to the destination. Looking at the visited list in Table 4, the best path from E to the destination involves traveling from E to F. Thus, F is added to the path. The visited list also indicates that the best path from F to D is directly from F to D. Thus, the path built is O-B-E-F-D.

Figure 5:
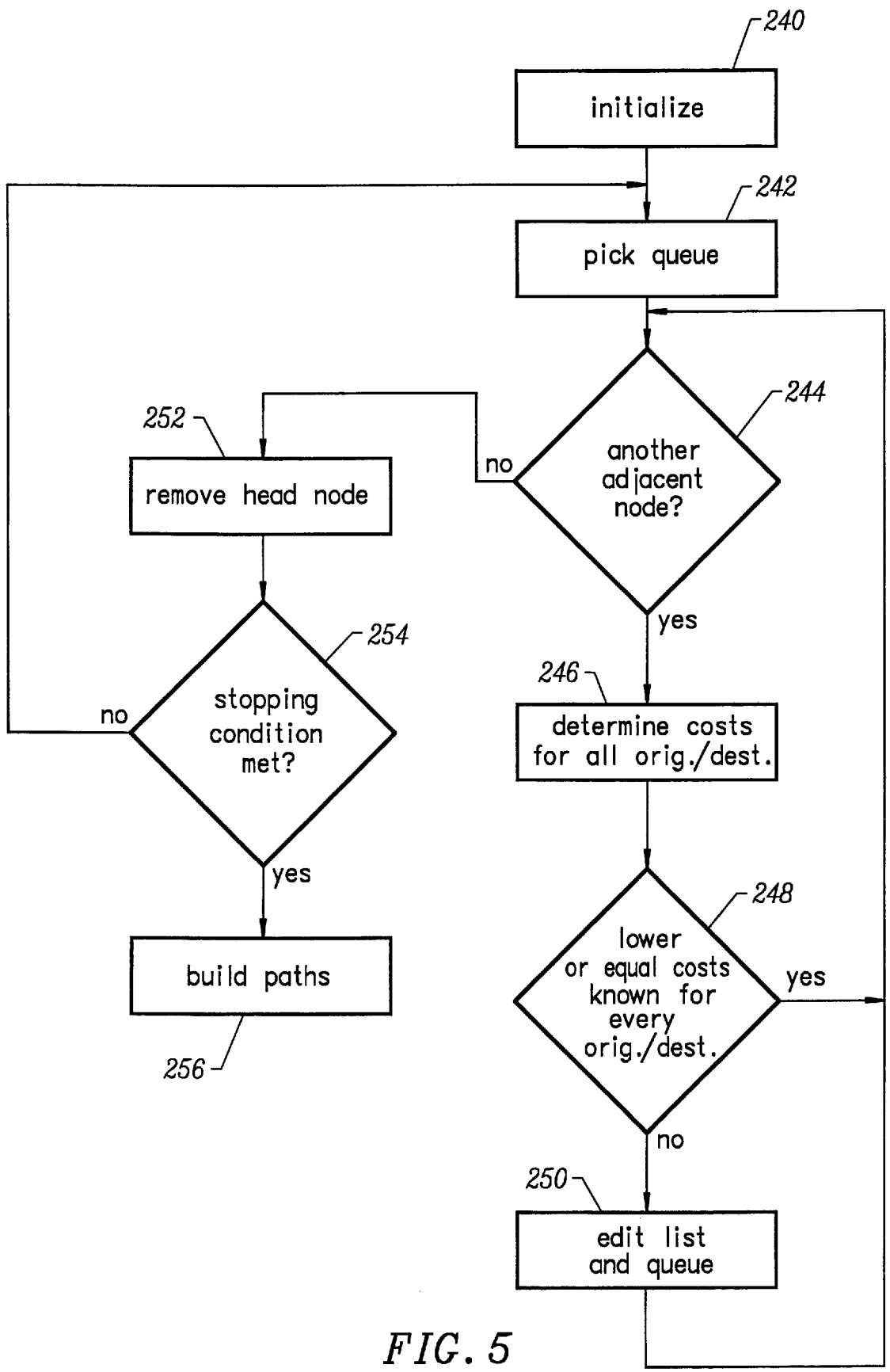
FIG. 5 is a flow chart describing a second method for performing a pathfinding exploration.

FIG. 5 is a flow chart describing a second method for performing a pathfinding exploration. In some respects, the method of FIG. 5 can be viewed as a parallel version of the method of FIG. 4. That is, the general steps taken in FIG. 5 are similar to the steps taken in FIG. 4; however, the method of FIG. 5 can be used to explore for multiple origins (and/or multiple destinations) simultaneously (in parallel). Looking at FIG. 3, for example, suppose a user requests that the system find a path to D from two origins O and B. Rather than perform the steps of FIG. 4 twice, the system can perform the steps of FIG. 5 to simultaneously find paths from O to D and from B to D.

In step 240 of FIG. 5, the system initializes. Step 240 is similar to step 202 of FIG. 4. That is, an origin priority queue, an origin visited list, a destination priority queue and a destination visited list can be set up. A difference between the visited lists of FIG. 5 and the visited lists of FIG. 4 is that each node will have a cost and previous column for each origin (or destination). In the example of determining paths from O to D and B to D of FIG. 3, each node in the origin visited list would have two costs and two previous columns.

The priority queue of the FIG. 5 process is similar to the priority queue of the FIG. 4 process, except that the priority queue of the FIG. 5 process has an extra column called the Index. As will be explained below, the key for each node on the priority queue is associated with travel between the node in the queue and one of the origins (or one of the destinations). The Index for a node in the priority queue indicates the particular origin (or destination) associated with the key.

In one embodiment, the processes of FIG. 4 or FIG. 5 can be performed by exploring from the origin and not from the destination; therefore, an origin priority queue and origin visited list are used but no destination priority queue or destination visited list are used. In another embodiment, the processes of FIG. 4 and FIG. 5 can explore from the destination and not from the origin; therefore, a destination priority queue and a destination visited list are used but no origin priority queue or origin visited list are used.

In step 242, the system picks a queue, similar to step 204. If the system is exploring from the origin and not from the destination, then there is no need to pick a queue and step 242 can be skipped. In step 244, the system determines whether there is another adjacent node that has not been considered. The system will look for adjacent nodes to the head node on the priority queue. If there is another adjacent node, the system performs step 246 which includes determining costs to the adjacent node, through the head node, from all of the origins (or all of the destinations). Each of the costs determined in step 246 is a new cost. Each new cost is associated with an origin and an intermediate node. In step 248, the system determines whether a lower or equal cost is already known for any origin/intermediate node pair for which a new costs was determined in step 246. If so, the system loops back to step 244. If not, then the priority queue and visited list are edited in step 250. When editing the visited list, if the node was not on the visited lists, it is added with each new cost. If the node was already on the visited list, then the new costs are added and will replace any existing higher costs, but not replace existing lower costs. If the adjacent node is not on the priority queue, then editing the priority queue includes adding that node to the priority queue with a key equal to the lowest cost of the set of new costs. If the adjacent node is on the priority queue and the lowest cost of the set of new costs is lower than the key, the key is updated to the lowest cost of the set of new costs. If a node's key is updated, the node's corresponding Index is also updated.

In step 244, if there are no more adjacent nodes to the head node on the priority queue, then the head node from the appropriate priority queue is removed in step 252 and the system determines whether a stopping condition has been met in step 254.

The stopping conditions can be any of the above-described stopping conditions explained with respect to step 214. Alternatively, the stopping condition can be met when there are no more nodes in the priority queue(s). In one embodiment, the stopping condition is met if all the destinations have been reached and the key of the head node of the origin priority queue is greater than the greatest known cost from any origin to any destination along a path that can be built from the visited list. Another embodiment uses the stopping condition described in the previous sentence as a primary stopping condition and also tests for a secondary stopping condition. A suitable secondary stopping condition is met when the priority is empty, with no nodes beyond a distance X from the nearest origin being added to the priority queue during the pathfinding process. One example of a distance X is twice the maximum as the crow flies distance between any origin and destination.

If the stopping condition has not been met, the system loops back to step 242 and picks the next queue. If the stopping condition has been met, then the system builds paths in step 256. Since the method is performed for multiple origins or multiple destinations, multiple paths are built.

For exemplar purposes, assume that a user only wants to determine two paths in the network of FIG. 3: O to D and B to D. Since there are two origins, both origins are initially placed in the priority queue. Any order will do. Assume that O is the first head node. Table 6 shows the origin priority queue and visited list after step 240. The costs of traveling from origin O to node B and from origin B to node O is initially set at infinity.

TABLE 6

| Origin Priority Queue | | | Origin Visited List | | | | |
|---|---|---|---|---|---|---|---|
| Node | Key | Index | Node | Cost/O | Prev/O | Cost/B | Prev/B |
| O | 0 | O | B | Inf. | — | 0 | — |
| B | 0 | B | O | 0 | — | Inf. | — |

In this example, assume that the system is only exploring from the origin; therefore, there is no need to pick a queue in step 242. In step 244, the system determines that there are three adjacent nodes A, B and G. The system arbitrarily picks node A in step 244 and determines the cost of traveling from the origins through the head node to A. At this point the only path and cost that can be determined are directly from O to A with a cost of 9. There are no paths from B to A, through O, that can be determined at the moment. Since there is no lower cost known, the system edits the visited list and priority queue in step 250 and loops back to step 244 and picks node B. The costs of traveling from O to B is 3 (step 246), there is no lower cost known (step 248), the system edits the visit list and priority queue (step 250), and the system loops back to step 244 to consider node G. The cost of traveling from O to G is 7 (step 246), there is no lower cost known (step 248), the system edits the visit list and priority queue (step 250) and loops back to step 244. At this point, there are no additional adjacent nodes to the head node O, the head node is removed in step 252 and the stopping addition is tested in step 254. Note that B was already in the origin priority queue prior to step 250; however, the key of zero is replaced with a new key of 3. Table 7, below, represents the state of the origin priority queue in origin visit list at this point in the computation.

TABLE 7

| Origin Priority Queue | | | Origin Visited List | | | | |
|---|---|---|---|---|---|---|---|
| Node | Key | Index | Node | Cost/O | Prev/O | Cast/B | Prev/B |
| B | 3 | O | A | 9 | O | Inf. | — |
| G | 7 | O | B | 3 | O | 0 | — |
| A | 9 | O | G | 7 | O | Inf. | — |
| | | | O | 0 | — | Inf. | — |

In this example, the stopping condition is met if all of the destinations have been reached and the head node of the origin priority queue is greater than the known cost from any origin to any destination. At this point in the computation none of the destinations have been reached; therefore, the stopping the condition fails (step 254).

The head node on the priority queue is B. Node B has two adjacent nodes A and E. In step 244, the system considers node A. The cost of traveling from B to A is 3 (step 248), so the system adds 3 to the known costs traveling to B from all of the origins. The new cost of traveling from O to A is 6 and the new cost of traveling from B to A is 3. Both these new costs beat the previous old costs of 9 for traveling from O and of infinity from traveling from B, so the visited list and priority queues are updated with the new costs. When the system considers node E, step 246 will be used to determine the cost of traveling from node B to node E as 2. Since there are no previously known costs of traveling to E (step 248), the edited list and priority queue are edited accordingly (step 250). The head node is removed (step 252) and the stopping condition is tested (step 254). At this point the stopping condition fails. Table 8, below, reflects the condition of the origin and priority queue and origin visited list at this point in the computation.

TABLE 8

| Origin Priority Queue | | | Origin Visited List | | | | |
| --- | --- | --- | --- | --- | --- | --- | --- |
| Node | Key | Index | Node | Cost/O | Prev/O | Cost/B | Prev/B |
| E | 2 | B | A | 6 | B | 3 | B |
| A | 3 | B | B | 3 | O | 0 | Inf. |
| G | 7 | O | E | 5 | B | 2 | B |
| | | | G | 7 | O | Inf. | — |
| | | | O | 0 | — | Inf. | — |

Node E is the head note on the priority queue. Node E has two adjacent nodes C and F (step 244). First the system chooses node C. The cost of traveling from node E to node C is 4; therefore, the cost of traveling to node C from O is 9 and traveling to node C from node B is 6 (step 246). Since C is not already on the priority queue or the visit list, there are no known costs (step 248), and the origin priority queue and visit lists are edited accordingly (step 250). The system then loops back to step 244 and considers node F. The cost of traveling from E to F is 2; therefore, the cost of traveling from O to F is 7 and from B to F is 4 (step 246). Since F is not already on the visited list or the priority queue (step 248), both are edited accordingly in step 250. The system loops back to 244 and determines that there are no more adjacent nodes. Head node E is removed in step 252 and the stopping condition is determined to fail in step 254. Table 9, below, reflects the state of the origin priority queue and origin visited list at this point in the computation.

TABLE 9

| Origin Priority Queue | | | Origin Visited List | | | | |
| --- | --- | --- | --- | --- | --- | --- | --- |
| Node | Key | Index | Node | Cost/O | Prev/O | Cost/B | Prev/B |
| A | 3 | B | A | 6 | B | 3 | B |
| F | 4 | B | B | 3 | O | 0 | Inf. |
| C | 6 | B | C | 9 | E | 6 | E |
| G | 7 | O | E | 5 | B | 2 | B |
| | | | F | 7 | E | 4 | E |
| | | | G | 7 | O | Inf. | — |
| | | | O | 0 | — | Inf. | — |

Node A is now at the top of the priority queue. Node A has 3 adjacent nodes C, O and B. The system first chooses node O. The cost of traveling from node A to node O is 9; thus, the path from origin O through the head node back to origin O is 15. The path from B to A to O is 12. In step 248, the system determines that there is not a lower cost known for every single origin. There is a lower cost known for one of the origins. That is, the costs already known for getting to node O from node O is zero. This is lower than the new cost of 15; therefore, the new cost is not added to the origin priority queue or the visited list. The new cost of traveling from node B to node is O is 12 which is lower than the already known cost of infinity. Thus, the new cost of 12 was added to the origin visited list in step 250. The system loops back to step 244 and node B is considered. The cost of traveling from A to B is 3. The cost of traveling from origin O to B, via A, is 12 and the cost of traveling from B to A to B is 6. In step 248, the system determines that it has lower costs already known for each of the origins and, therefore, the system does not edit the visit list or origin priority queue and loops back to step 244. In step 244 the system considers node C. The cost of traveling from node A to node C is 4. The new cost of traveling to node C from node O is 13. The new cost of traveling from node B to node C, via node A, is 7. Since there are lower costs known for each origin (step 248) the system loops back to step 244 and does not edit the origin visited list or priority queue. In step 252, the head node is removed. In step 254 it is determined that the stopping condition fails. Table 10 represents the state of the origin priority queue and origin visited list at this point in the computation.

TABLE 10

| Origin Priority Queue | | | Origin Visited List | | | | |
| --- | --- | --- | --- | --- | --- | --- | --- |
| Node | Key | Index | Node | Cost/O | Prev/O | Cost/B | Prev/B |
| F | 4 | B | A | 6 | B | 3 | B |
| C | 6 | B | B | 3 | O | 0 | — |
| G | 7 | O | C | 9 | E | 6 | E |
| O | 12 | B | E | 5 | B | 2 | B |
| | | | F | 7 | E | 4 | E |
| | | | G | 7 | O | Inf. | — |
| | | | O | 0 | — | 12 | A |

Node F is the head node on the priority queue. Node D is the only node adjacent to node F (step 244). In step 246, the system determines the cost of traveling from node F to node D as being 4. Thus, the cost of traveling from O to D is 11 and from B to D as 8 (step 246). Since D is not in the origin visited list or origin priority queue (step 248), the system edits the visited list and priority queue in step 250 to add D and its costs. In step 244, the system determines that there is no further adjacent nodes. The head node is removed in step 252. The stopping condition is tested in step 254. Table 11 reflects the state of the origin priority queue and origin visited list at this point in the computation.

TABLE 11

| Origin Priority Queue | | | Origin Visited List | | | | |
| --- | --- | --- | --- | --- | --- | --- | --- |
| Node | Key | Index | Node | Cost/O | Prev/O | Cost/B | Prev/B |
| C | 6 | B | A | 6 | B | 3 | B |
| G | 7 | O | B | 3 | O | 0 | — |
| D | 8 | B | C | 9 | E | 6 | E |
| O | 12 | B | D | 11 | F | 8 | F |
| | | | G | 5 | B | 2 | B |
| | | | F | 7 | E | 4 | E |
| | | | G | 7 | O | Inf. | — |
| | | | O | 0 | — | 12 | A |

When checking the stopping condition, the system notes that all destinations (in this case 1) have been reached and there is a path known from each origin to each destination.

The system must also test whether the key of the head node of the priority queue is greater than the greatest known cost from any origin to any destination along a path that can be built from the visited list. The known costs from the origins to the destinations are O to D with a cost of 11 and B to D with a cost of 8; thus, the greatest known cost is 11. Since 6 is less than 11, the stopping condition fails.

The head node of the priority queue is C. There were 3 nodes adjacent to C: A, E and D. When the system performs steps 244–250 for nodes A, E and D, the system will determine new costs all of which are greater than the costs already known; therefore, the priority queue and visited list will not be edited for any of these 3 adjacent nodes. After the head node C is removed from the priority queue, the stopping condition will fail because the cost for new head node G is 7, which is still lower than 11.

Node G is now the head node on the priority queue. Node G has three adjacent nodes: O, H and I. The system first considers node H in step 244. The costs of traveling from G to H is 5. The cost of traveling from O to G to H is 12. Since there is no cost/path in the visited list for traveling to G from B, the system can not determine a path for traveling from node B to node H via node G; therefore, the cost of traveling to nodes G and H from node B is recorded as infinite. Since there are no costs known for traveling to node H (step 248), the visited list and priority queues are edited in step 250 and the system moves back to step 244. The system then considers node I. The costs of traveling from O to G to I is 10 and the system can not compute a cost of traveling from B to G to I (step 246). Since I is not already in the priority queue or visited list, there is no costs already known (step 248), the visited list in priority queues are edited in step 250 and the system loops back to step 244 to consider node O. The cost of traveling from O to G to O is 10 (step 246). There is already a lower cost known for traveling to O from O; therefore, the visited list and priority queue are not edited. In step 244, the system determines that there are no more adjacent nodes and the head node is removed in step 252. Table 12 depicts the state of the priority queue and visited list at this point in the computation.

TABLE 12

| Origin Priority Queue | | | Origin Visited List | | | | |
|---|---|---|---|---|---|---|---|
| Node | Key | Index | Node | Cost/O | Prev/O | Cost/B | Prev/B |
| D | 8 | B | A | 6 | B | 3 | B |
| I | 10 | O | B | 3 | O | 0 | — |
| O | 12 | B | C | 9 | E | 6 | E |
| H | 12 | B | D | 11 | F | 8 | F |
|  |  |  | E | 5 | B | 2 | B |
|  |  |  | F | 7 | E | 4 | E |
|  |  |  | G | 7 | O | Inf. | — |
|  |  |  | H | 12 | G | Inf. | — |
|  |  |  | I | 10 | G | Inf. | — |
|  |  |  | O | 0 | — | 12 | A |

The stopping condition is still not met because the head node has a key of 8 which is not greater than 11, the cost of traveling from E to D.

The head node is D, which has two adjacent nodes: C and F. When the system performs steps 244–250 for nodes C and F, the costs found will be higher than the known costs. Therefore, the priority queue and visited list will not be edited. After the system removes head node D from the priority queue in step 252, the stopping condition will be tested in step 254. The new head node on the priority queue is node I. The key for I is 10. Since 10 is less than the cost of the path from E to D (which is 11) the stopping condition fails.

Node G is the only node adjacent to node I. The cost of traveling from O to G, via I, is 13. The cost of traveling from B to G, via I, is not known, so the system uses infinity. Since lower (or equal) costs are known for each origin (step 248), the system skips step 250 and loops back to step 244. There are no more adjacent nodes. Node I is removed from the head of the queue (step 252). The new head node is node O, with a cost of 12. The stopping condition is now met because the cost of the head node, which is 12, is greater than the greatest known cost from any origin to any destination, which is 11. The system builds the paths in step 256. The paths built are B-E-F-D and O-B-E-F-D.

Figure 6:
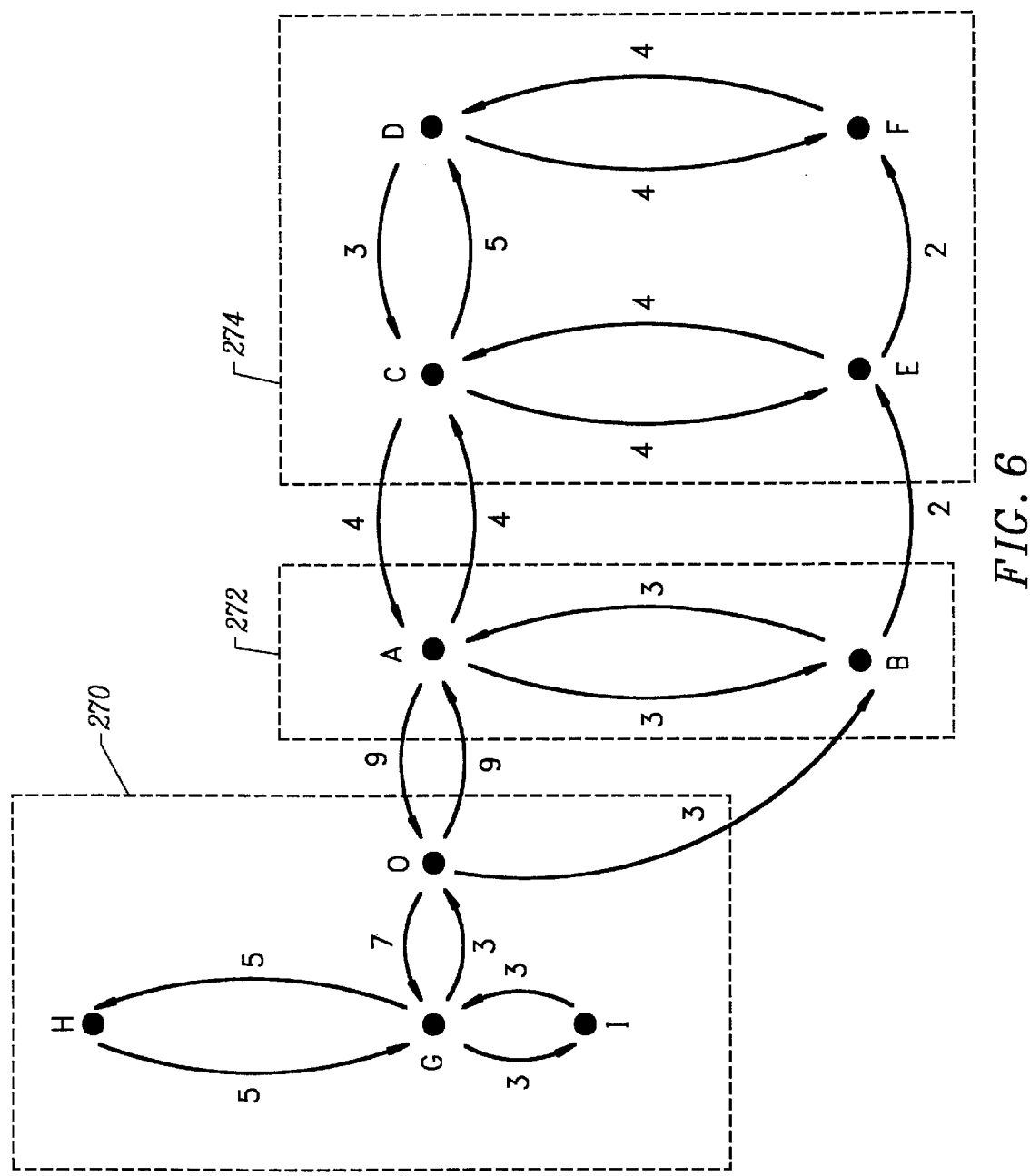
FIG. 6 is an example of how the network of FIG. 3 may be divided into tiles.
Figure 13:
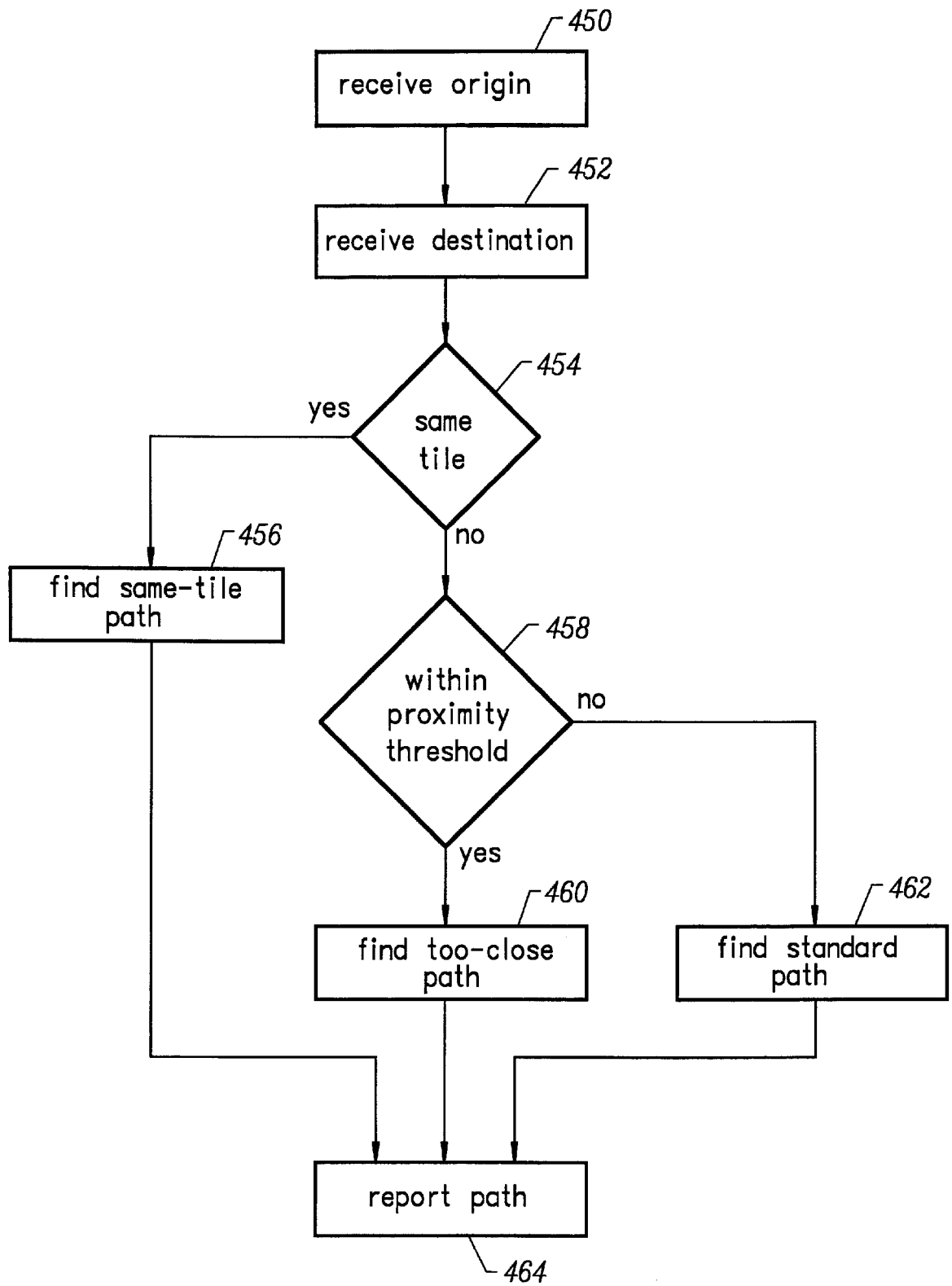
FIG. 13 is a flow chart describing a method for determining a path.

As the distance between origin node and destination node increases, the number of nodes and links that must be considered in determining a path between the origin and destination can increase greatly. As a result, a system performing a pathfinding calculation on an electronic map may need to perform a tremendous number of computations and may need to perform a large number of disk accesses. This may significantly increase the time required for finding a path between an origin and destination. The present invention is able to decrease the time necessary for pathfinding using the process depicted in FIG. 13. The process of FIG. 13 is employed on network that has been separated into regions called "tiles." A tile can be a region on a graphical map and/or a group of data (or clusters of data) having some geographical relationship. FIG. 6 illustrates one way of dividing the directed graph of FIG. 3 into tiles. A first tile 270 consists of nodes H, G, I and O; a second tile 272 consists of nodes A and B; and a third tile 274 consists of nodes C, D, E, and F. The tiles can be defined by separating geographic regions.

Alternatively, tiles can be defined without looking at a visual representation of a graph. For example, a tile can be a set of clusters. An example of clustering technology can be found in U.S. Pat. No. 5,706,503, "Method of Clustering Multi-Dimensional Related Data in a Computer Database," incorporated herein by reference.

One method for putting data in clusters includes sorting all the nodes (grouped where there are associated links) by position. The nodes are spatially divided and subdivided to form a k-D tree. The dividing and subdividing continues until the size of the file records needed to represent each subdivision is estimated to be below a nominal target value. The collection of nodes and links in these subdivisions define the clusters. The subdivisions are then ordered with a spatial curve. Sequential cluster records in a file (preferably, but not necessarily) represent spatially contiguous regions in the physical world. Its order should arise naturally. Thus, a network file is created that includes all the clusters ordered according to the spatial curve. Each tile consists of a number of clusters that are contiguous in the network file. The size of a tile should be defined so that it can be read in one disk access. In alternative embodiments, the tile could be bigger and, therefore, may need more than one disk access to be read. For efficiency purposes it is best to pick a tile size to reduce disk accesses.

The k-D tree described above is a k-dimensional binary-search tree sometimes called a multidimensional binary tree. One paper of interest in this area is F.P. Preparata and M.I. Shamos, "Computational Geometry: An Introduction," Springer-Verlag (1985). One example of a suitable spatial curve is a Hilbert Curve.

In addition to utilizing a network broken up into tiles, the current invention also utilizes a number of webs. A web is defined to be a set of pre-computed paths. The current invention uses four types of webs: an exit-to-entrance web, a vicinity web, a self web and a too-close web. The exit-to-entrance web contains pre-computed paths from the exit nodes of one or more potential origin tiles to the entrance nodes of all or some potential destination tiles. In one embodiment, it may be simpler to have the exit-to-entrance web include only pre-computed paths from exit nodes of one tile to the entrance points of all potential destination tiles. In another embodiment, the exit-to-entrance web includes pre-computed paths from exit nodes for one origin tile to entrance nodes of a set of potential destination files, the set being less than all potential destination tiles. In this alternative, an origin tile may have more than one exit-to-entrance web. In one alternative, the size of the set can be determined such that the exit-to-entrance web can be read with one disk access.

An exit node can be thought of as a node that is used after exiting a tile to get to many other places. The set of exit nodes for a particular tile are chosen so that at least one of the exit nodes is on every useful path out of the tile. The entrance node is a node traversed on the way to entering a tile. The set of entrance nodes are chosen such that all useful paths to enter the tile will traverse at least one of the entrance nodes. Determining exit and entrance nodes will be discussed below.

The boundary of a tile is defined by a set of exit boundary nodes and entrance boundary nodes. The exit boundary nodes are all of the nodes in a tile that have an outgoing link extending to a node outside of the tile. The entrance boundary nodes are all of the nodes in a tile that have an incoming link extending from a node outside of the tile. A node may be both an exit boundary node and an entrance boundary node.

Figure 7:
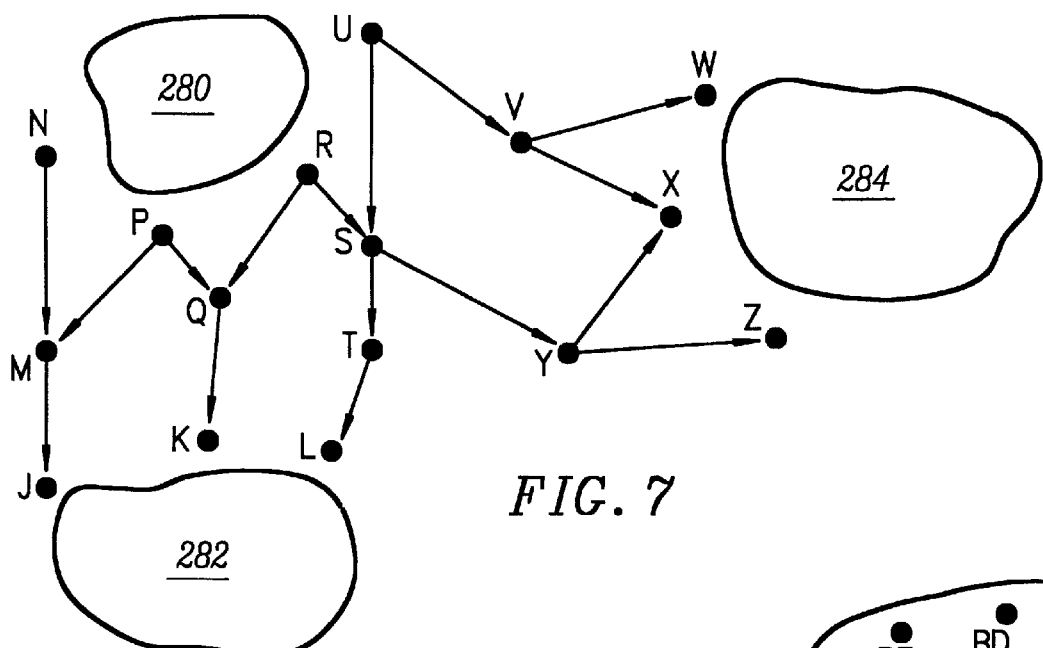
FIG. 7 illustrates an exit-to-entrance web.

FIG. 7 shows an example of an exit-to-entrance web. Three tiles are depicted in FIG. 7: tile 280, tile 282 and tile 284. Note that, for exemplar purposes, the tiles are shown without any detail. FIG. 7 shows the exit-to-entrance web for tile 280, where the origin is in tile 280 and the destinations will be in tiles 282 or 284. The exit nodes for tile 280 include nodes N, P, R and U. The entrance nodes for tile 282 include nodes J, K and L. The entrance nodes for tile 284 include nodes W, X and Z. All the lines with arrows show possible paths between nodes. Thus, all the paths shown in FIG. 7 are part of paths from the exit nodes of tile 280 to the entrance nodes of tiles 282 or 284. Thus, the paths shown in FIG. 7 comprise the exit-to-entrance web for tile 280.

Figure 8:
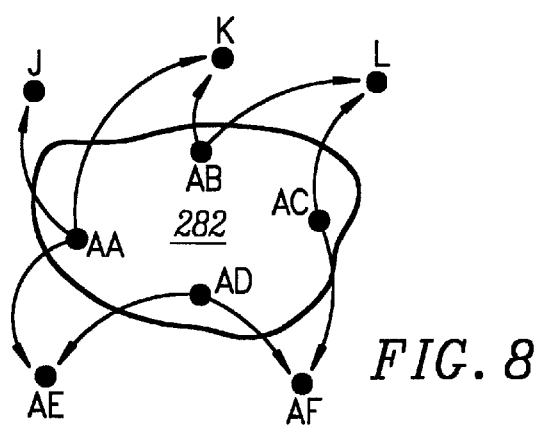
FIG. 8 illustrates a vicinity web.

The vicinity web includes pre-computed paths between the boundary nodes of a tile and the exit nodes/entrance nodes of the tile. A tile can have a destination vicinity web for its entrance nodes and an origin vicinity web for its exit nodes. FIG. 8 shows the origin vicinity web for tile 282. Nodes J, K, L, AE and AF represent the exit nodes for tile 282 and nodes AA, AB, AC and AD represent the boundary nodes for tile 282. The lines with arrows show the paths between the boundary nodes and the exit/entrance nodes and, therefore, comprise the vicinity web.

Figure 9:
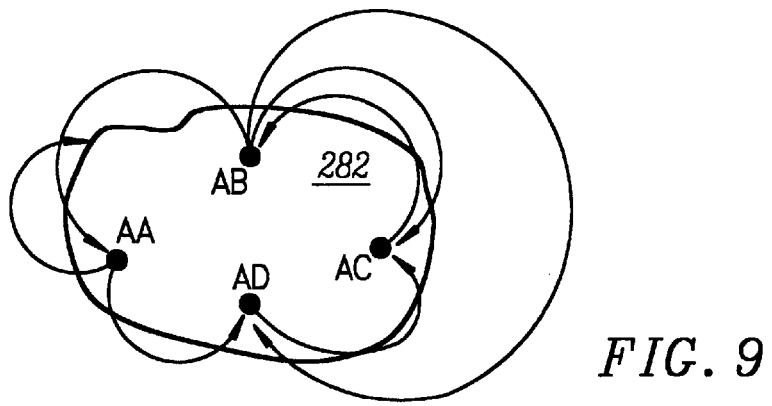
FIG. 9 illustrates a self web.

The self web includes parts of the pre-computed paths from the exit boundary nodes of a tile to the entrance boundary nodes of the same tile. It is usually best to exclude the parts of the paths that are inside the tile because those parts are already included in the data records that define the tile. An example of an obvious need for a self web is if a tile is cut in half by a river and the only bridge across the river is outside the tile. Thus, travel from an origin to a destination in the same tile may require traveling outside the tile to cross the bridge. FIG. 9 is an example of a self web for tile 282. The paths shown are between the boundary nodes AA, AB, AC and AD. To reduce disk accesses, one embodiment includes combining the data for a tile's self web and vicinity web such that the data for both webs can be read in one disk access.

Figure 10:
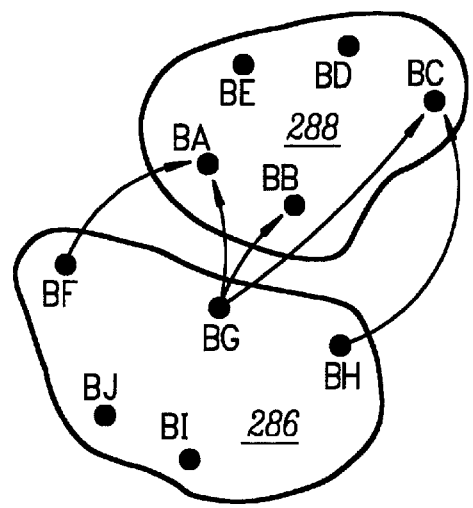
FIG. 10 illustrates a too-close web.

The too-close web includes parts of pre-computed paths between the boundary nodes of one or more origin tiles and the boundary nodes of one or more (or all) destination tiles that are too close to the origin tile for the exit-to-entrance web to be used. For each origin tile-destination tile pair, it is usually best to exclude the parts of the path that are inside the tiles because those parts are included in the data records that define the tiles. An efficient embodiment of the too-close web includes parts of pre-computed paths from the boundary nodes of one origin tile to the boundary nodes of a set of destination tiles that are too close (or within a proximity threshold). The set should include as many too-close destination tiles that allow for the too-close web to be read in one disk access. FIG. 10 shows a too-close web for origin tile 286 and destination tile 288. Tile 286 includes boundary nodes BF, BG, BH, BI and BJ. Tile 288 includes boundary nodes BA, BB, BC, BD and BE. The too-close web includes paths from BF to BA, BG to BA, BG to BB, BG to BC, and BH to BC.

Figure 11:
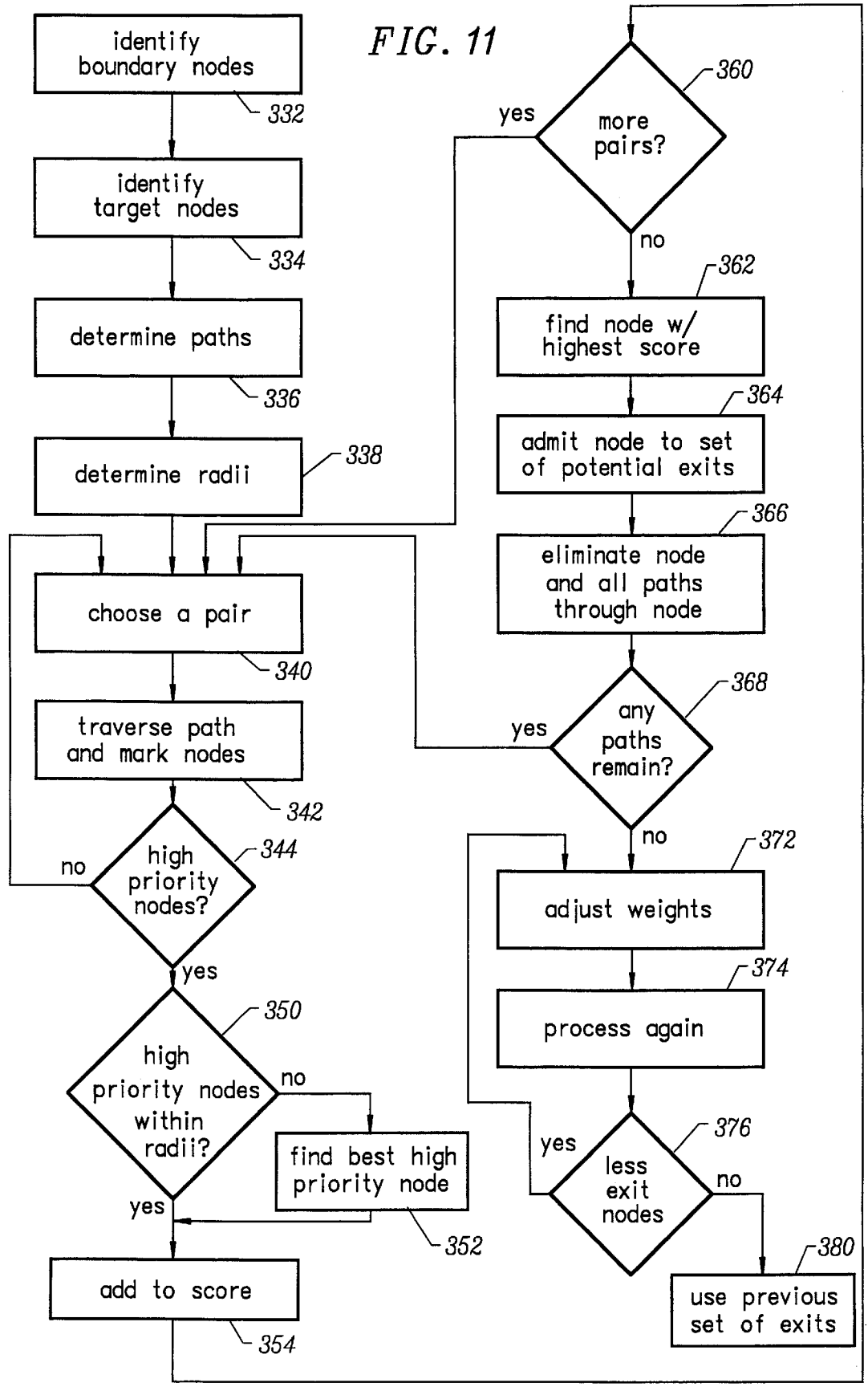
FIG. 11 is a flow chart describing a method for determining exit nodes.

FIG. 11 describes one method for determining the exit or entrance nodes for a tile. The method of FIG. 11 could be performed once to find exit nodes and once to find entrance nodes. An alternative method for determining exit/entrance nodes can be found in U.S. patent application Ser. No. 08/756,258, filed Nov. 25, 1996, Richard F. Poppen, "Method For Determining Exits and Entrances For a Region in a Network," now issued as U.S. Pat. No. 5,916,299 incorporated herein by reference. The first step in FIG. 11 is to identify boundary nodes (step 332). As discussed above, boundary nodes include exit boundary nodes and entrance boundary nodes. The exit boundary nodes for a particular tile are all the nodes in the tile that have a link to a node outside the tile. The entrance boundary nodes for a tile are all those nodes inside the tile that have a link from a node outside the tile. Step 332 includes determining whether any of the nodes in a tile under consideration meet either of the conditions of an exit boundary or an entrance boundary node.

In addition to identifying a set of exit boundary nodes, a set of exit target nodes are identified for the tile in consideration. Exit target nodes are a set of nodes that cannot be reached from the tile without incurring a sufficient cost C. In one method, the tiles which are partially outside the cost C (i.e. which have some nodes that cannot be reached from the tile without incurring cost C) are noted. Then all the exit boundary nodes of those tiles which have links leading to tiles entirely outside the cost C are exit target nodes.

Entrance target nodes are a set of nodes from which the tile cannot be reached without incurring sufficient cost. Such a set may be defined as for the exit target nodes. A sufficient cost is usually, but not always, between 5–50 kilometers. The sufficient cost can be adjusted based on trial and error. Note that the sufficient cost C used to identify the target nodes could be a cost via the network of links or as the crow flies distance.

A method for determining the exit target nodes is to run a parallel pathfinding exploration using the method of FIG. 5, using all the exit boundary nodes as origins and only using an origin priority queue (which means exploring from the origins but not exploring from the destinations). As the exploration proceeds, all the tiles through which it passes are noted. When the key for the head node on the priority queue is greater than or equal to C (the sufficient cost used above), the system notes the tile that the head node is in and marks the head node as being beyond C. The exploration continues such that when the system explores from a head node that has been marked as being beyond C, the system, for that head node, only considers travel from the head node to adjacent nodes in the same tile as the head node. Any node in this tile so explored which is a boundary exit node for this tile, and which has a link into a tile which has not been noted as previously explored, is marked as an exit target node.

To find the entrance target nodes, the parallel pathfinding exploration of FIG. 5 is performed using the entrance boundary nodes as destinations, only operating on the destination priority queue and following essentially the same procedure as that for finding exit target nodes, except that in the last step we look for boundary entrance nodes instead of boundary exit nodes.

In addition to identifying the boundary nodes and target nodes, the system determines paths between the boundary nodes and target nodes in step 336. If the system is trying to find exit nodes, then step 336 is used to find paths between exit boundary nodes and exit target nodes. If the system is trying to find entrance nodes, then paths are determined between entrance target nodes and entrance boundary nodes. The step of determining paths includes utilizing the parallel path exploration of FIG. 5 such that the exit boundary nodes identified in step 332 are the origins, the target nodes identified in step 334 are the destinations and the system only uses an origin priority queue. The parallel pathfinding process will continue until the priority queue is empty. When the origin priority queue is empty, the system builds all possible paths.

After determining the paths between the boundary nodes and the target nodes, the system chooses two radii R1 and R2 such that R1<R2 and R2≦½ C(step 338). Examples of R1 include ⅓C and ¼C. The value of C is the same value discussed above in regard to finding target nodes. R1 and R2 can be adjusted experimentally in order to optimize and balance having too many exit nodes versus having the exit nodes being too far from the tiles and, thus, less useful.

After determining the two radii, the system chooses one pair of nodes. A pair of nodes is defined as a boundary node and a target node such that there is a path between the boundary node and target node. In step 340, the system chooses one of those pairs not already considered. In step 342, the system traverses along the path from the boundary node to the target node and marks all nodes traversed. If any of the nodes traversed and marked in step 342 are high priority nodes (step 344), then the system tests whether any of these high priority nodes are within the two radii (step 350). If any of the high priority nodes are within the two radii (R1 and R2), then the system adds to the score for each of those nodes (step 354). If none of the high priority nodes are within the two radii, then the system finds the best high priority node in step 352, and adds to that node's score in step 354. If step 344 determines that none of the nodes traversed and marked are high priority nodes, then the system loops back to step 340 and chooses a different pair.

A high priority node is defined to be a node at which there is a relatively important choice of direction. Perhaps, the high priority node is at an intersection of major roads. Each road in a map, or link in a network, is assigned a true priority. The true priority of a link can, for example, correspond to the typical driving speed for the corresponding road that the link represents. The higher the priority is, the faster the road is. Assuming six different types of roads, the following represents sampled true priorities: alleys-0, residential roads-1, collective roads-2, arterials-3, limited access roads-4 and highways-5. A "shortcut priority" of a link is defined to be the maximum priority Z such that the link is part of the best path from a link of true priority X to a link of true priority Y, and Z is the lower of either X or Y. The "use priority" of a link is defined to be the maximum between the true priority of the link and the shortcut priority of the link. The priority of a node is the maximum use priority for which there are two or more forward links with at least that use priority. In other words, if a node has three forward links (i.e., links leaving the node), with use priorities 1, 1 and 2, respectively, the node is assigned priority 1. If the use priorities of the links from a node are 1, 2, 2, the node would be assigned priority 2. If there is only one forward link, the node has a priority of 0.

The process of finding a best node in step 352 includes finding a node that is proportionally the closest to being within the two radii. That is, if a node is inside R1, the system looks at proportional distance $D_1/R1$, where $D_1$ is the distance as the crow flies the node is from R1. If a node is outside R2, the system looks at proportional distance $D_2/R2$, where $D_2$ is the distance of the node from R2. The node with the smallest proportional distance is identified in step 352, unless $D_2$ is greater than twice R2, in which case the node at $D_1$ is picked.

Before the process of FIG. 11 starts, each node has a score of 0. The first time the process of FIG. 11 is performed, any node whose score is increased in step 354 is increased by a value of 1 each time it is processed in step 354. Since a node may be on many paths, it may have its score increased many times. After a system has increased the scores of the appropriate nodes, the system determines whether there are any more pairs that have not yet been considered (step 360). If there are more pairs, the system loops back to step 340 and a new pair is chosen.

If there are no more pairs to consider in step 360, then the system finds the node with the highest score in step 362. In step 364, the node identified in step 362 is admitted to a set of potential exits. In step 366, all paths traveling through the node identified in step 362 are eliminated from a temporary database of paths found in step 336. The system then determines whether any paths remain in that temporary database (step 368). If any paths do remain, the system loops back to step 340 and chooses a pair of boundary/exit nodes to consider. When the system reaches step 368, the list of pairs previously considered is thrown out and initialized such that when the system loops from step 368 to step 340 it is assumed that no pairs have been considered. Thus, steps 340 to 360 are repeated for the entire database (minus paths eliminated). Therefore, steps 340 to 368 are continuously repeated until there are no more paths left in the temporary database. At this point, step 364 has identified a set of many potential exits.

After no more paths remain in step 368, the system loops to step 372 and adjusts the weights. The weight is defined to be the amount that a score is increased in step 354. Initially, each score was increased by a weight equal to 1. The paths are re-weighted so that each node on a path has the same weight. The re-weighting is done in such a way that paths which are hard to cover (because there are few acceptable nodes in them) are given higher weight. Each time an exit node and its associated paths are removed, the system assigns a temporary new weight to all the paths. That temporary weight is one divided by the number of paths that were covered by that node. So, if the node covered three paths, each of those three paths is given a temporary weight of ⅓. After all the exits have been found for the current iteration (i.e. all the paths have been removed), the system finds a multiplicative factor for the temporary weights. The multiplicative factor is the reciprocal of the average of all the temporary weights, for all the pairs. In other words, it is the number of pairs divided by the sum of all temporary weights. Next, the system re-weights all the pairs. The system multiplies each temporary weight by the multiplicative factor, and then multiplies that product by the original weight. The system then takes the square root of this product to obtain the new weight for the pair. All the weights are adjusted accordingly.

In step 374, the system processes all the nodes another time. Step 374 actually consists of performing another iteration of steps 340 to 372 starting with a full set of paths and all the pairs to be considered, but using the new weights. Therefore, step 374 determines a new set of potential exits. In step 376, the number of nodes in the new set of potential exits is compared against the number of nodes in the immediately previous found set of potential exits. If the recent iteration of step 374 found less exits than the previous set, the system loops back to step 372. If step 374 found more exits, then the process is done and the system uses the previous set of exits for further usage as the exit nodes for the tile (step 380). Entrance nodes are found in a similar manner as exit nodes; however, the system considers paths between entrance target nodes and entrance boundary nodes.

The above description notes one particular method for determining entrance nodes and exit nodes. The exact method for determining entrance and exit nodes is not critical to the pathfinding process of FIG. 13. Other suitable methods for determining a reasonable set of exit or entrance nodes may be used without materially effecting the pathfinding computation.

Once the exit and entrance nodes are found for each tile, then the webs can be determined for each tile. The exit-to-entrance web for a particular tile is determined by using the parallel pathfinding exploration method of FIG. 5 such that all of the exit nodes for the particular tile are the origins and all the entrance nodes for all of a set of possible destination tiles are the destinations. The exploration for the exit-to-entrance web uses the origin priority queue, does not use the destination priority queue and continues until the priority queues are empty. When an exploration does not use the destination priority queue, then it is only exploring from the origin(s) toward the destination(s). All tiles that are at least further than a proximity threshold from the particular tile in question are considered potential destination tiles and can have their entrance nodes included in the exploration to determine the exit-to-entrance web.

The self web is created using the parallel pathfinding exploration of FIG. 5 using the exit boundary nodes as the origins, and entrance boundary nodes as the destinations. The self web is created using an origin priority queue and not using a destination priority queue. The exploration will continue until the origin priority queue is empty or until all the destinations have been reached and the key of the head node of the origin priority queue is greater than the greatest known cost from any origin to any destination along a path that can be built from the visited list. An optional limitation in exploring for the self web is that no path is allowed to be considered that is more than a distance D from the tile. One exemplar D can be twice the diameter of the tile.

The too-close web is computed using the parallel pathfinding process of FIG. 5. The exit boundary nodes of the origin tile are used as the origins. The destinations are the entrance boundary nodes of destination tiles that are too close to the origin tile. The processes use the origin priority queue and does not use a destination priority queue. The stopping condition is met when the origin priority queue is empty or if all the destinations have been reached and the key of the head node of the origin priority queue is greater than the greatest known cost from any origin to any destination along a path that can be built from the visited list. An optional limitation placed on the pathfinding exploration is that the system cannot consider paths more than k from either tile, k=2*D, where D is the maximum distance (as the crows flies) between any two points in the origin and destination tiles.

Figure 12:
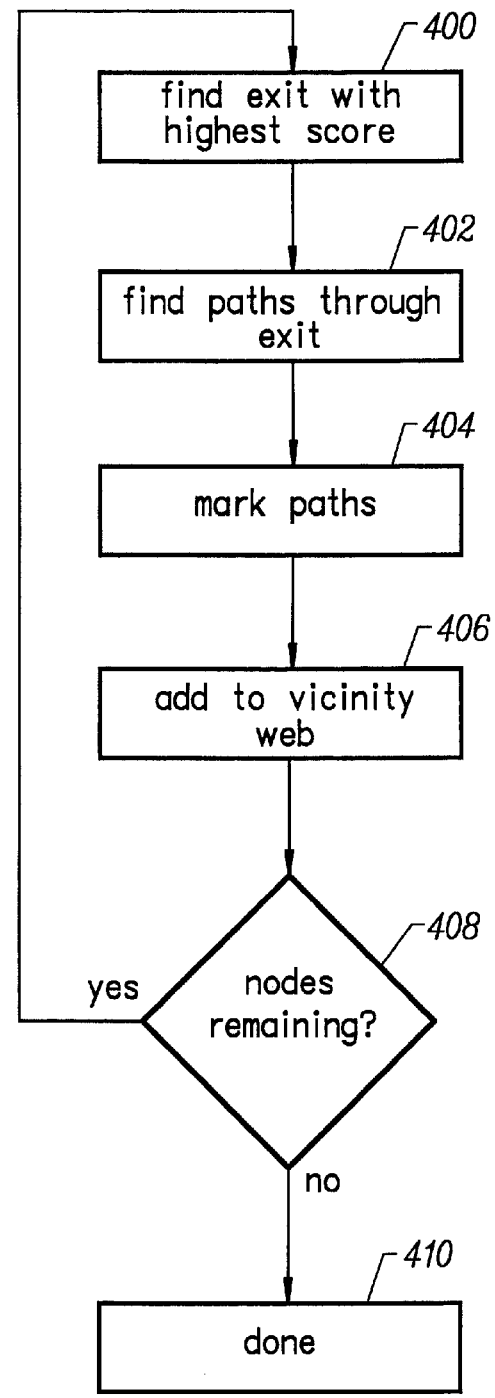
FIG. 12 is a flow chart describing a method for creating a vicinity web.

FIG. 12 is a flow chart explaining the process of building a vicinity web for a particular tile. The process of FIG. 12 is performed after the process of FIG. 11 and utilizes data determined during the process of FIG. 11. In step 400, the system finds the exit node with the highest score. The score being the final score that was increased in step 354 of FIG. 11. In step 402, the system determines all paths that travel through that exit. The system already knows the paths from the method of FIG. 11. Each of those paths are marked in step 404. Relevant portions of each of the marked paths are added to the vicinity web in step 406. The relevant portions are those sections between the boundary nodes and the exit/entrance nodes. In step 408, the system determines whether there are any exit/entrance nodes that have not been considered. If all such nodes have been considered, then the system is done and the vicinity web is complete in step 410. If there are still exit/entrance nodes that have not been considered, the system loops back to step 400, looks at the set of exit/entrance nodes not yet considered and finds the exit/entrance node with the highest score.

FIG. 13 is a flow chart of the pathfinding computation of the present invention. The pathfinding computation is performed, using a processor, on a processor readable representation of a network that has been broken up into tiles and further has been enhanced by including each of the webs discussed above. In step 450, the system receives an indication of an origin. In step 452, the system receives an indication of a destination. Receiving indications of the origin and destination could include a user imputing the origin and destination using a keyboard, a mouse, a light pen, voice recognition technology, etc. If the invention is implemented using software, receiving an indication of the origin and destination could include a call to the appropriate function performing the pathfinding process, passing source and/or destination parameters, or passing one or more pointers to source/destination information. Furthermore, receiving the indication of the source and destination can include reading a permanently hardwired or permanently stored source or destination.

After receiving the origin and destination, the system tests whether the origin and destination are in the same tile (step 454). If the origin and destination are in the same tile, the system determines a path from the origin to the destination using the same tile method of step 456. If the origin and destination are not in the same tile, then the system determines, in step 458, whether the origin tile (the tile that the origin resides in) is within a proximity threshold of the destination tile (the tile that the destination resides in). The test whether the tiles are within a proximity threshold of each other can be any one of a number of suitable tests to determine whether it is appropriate to use the too-close web or the exit-to-entrance web. One test is to determine whether the exit nodes of the origin tile are within a constant cost of the entrance nodes of the destination tile. That constant can be determined experimentally. Another test is to determine if any exit node of the origin tile is closer to the destination tile than any entrance node of the destination tile. A third test identifies all of the tiles that are within a proximity threshold of an origin tile as being those tiles that are within an area bounded by the exit target nodes. Alternatively, the tiles that are too close to an origin tile are those tiles that will be explored during the process of finding exit target nodes.

If the tiles are within a proximity threshold of each other, then the system performs the process of step 460. If the tiles are not within a proximity threshold of each other, the system performs the process of step 462. After either step 456, step 460 or step 462 are completed, the system loops to step 464 and the path is reported (step 464). The step of reporting the path could include providing a user with turn-by-turn directions on a display, printout or audio output. Additionally, reporting the path could include drawing a map, highlighting a path on a map, creating a file of directions, creating a file of the path, creating a pointer to a file, returning the path as part of a function call, transmitting data from the pathfinding process to a process calling the pathfinding process, etc.

Figure 14:
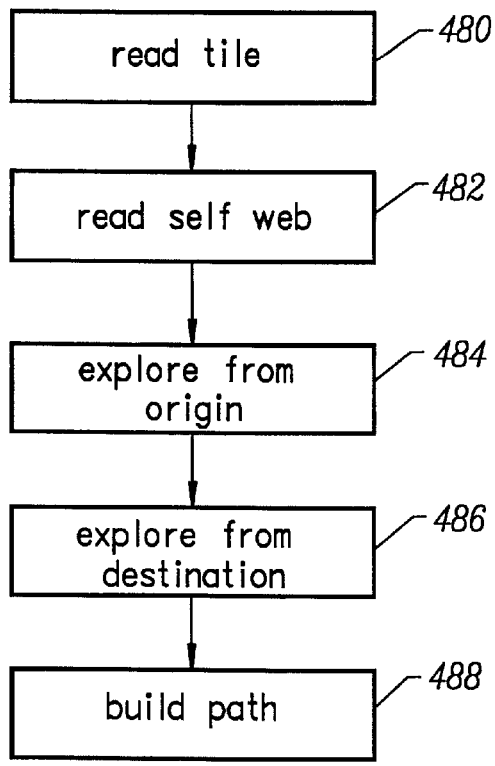
FIG. 14 is a flow chart describing step 456 of FIG. 13.

FIG. 14 is a flow chart explaining step 456 of FIG. 13 in more detail. The method of FIG. 14 is performed when the source and destination are in the same tile. In step 480, the system reads the data for the tile of the origin and destination. In step 482, the system reads the data for the self web. The terms "self web", "exit-to-entrance web", "vicinity web", and "too-close web" refer to both the data that make up the webs and the actual graphically depicted nodes and links. Further, it is appropriate and equivalent to say that a processor "reads the self web" or "reads the data representing the self web." By the phrase read a tile, read a self web, read data for a tile or read data for a self web, it is meant that the appropriate data is read. In one embodiment, data for the network, including the tiles and webs, is stored on a CD ROM.

After the appropriate data is read in steps 480 and 482, the system explores from the origin in step 484 and explores from the destination in step 486. The exploration method used in both steps 484 and 486 is the method depicted in FIG. 4, limited as described below. Steps 484 and 486 can be performed at the same time using separate origin and destination priority queues, or can be performed separately. Exploring from the origin includes using an origin priority queue (and not a destination priority queue) and only considering nodes within the tile and the self web. Exploring from the destination in step 486 includes using a destination priority queue (and not an origin priority queue), and considering nodes in the tile and in the self web. As an alternative, the exploration from the origin could use the self web and the exploration from the destination would not. Both explorations continue until the appropriate priority queue is empty or enough (e.g., 10) connection nodes are found. After both explorations have been completed, the system builds a path (step 488). The path utilizes the best connection node as described above, such that the path minimizes the cost of traveling from the origin to the destination. Note that the steps of FIG. 14 can be performed in a different order than depicted. For example, steps 484 and 486 can performed simultaneously or in reverse order. Steps 480 and 482 can be performed prior to steps 450 and 452, concurrently with steps 450 and 452 or at other appropriate times.

Figure 15:
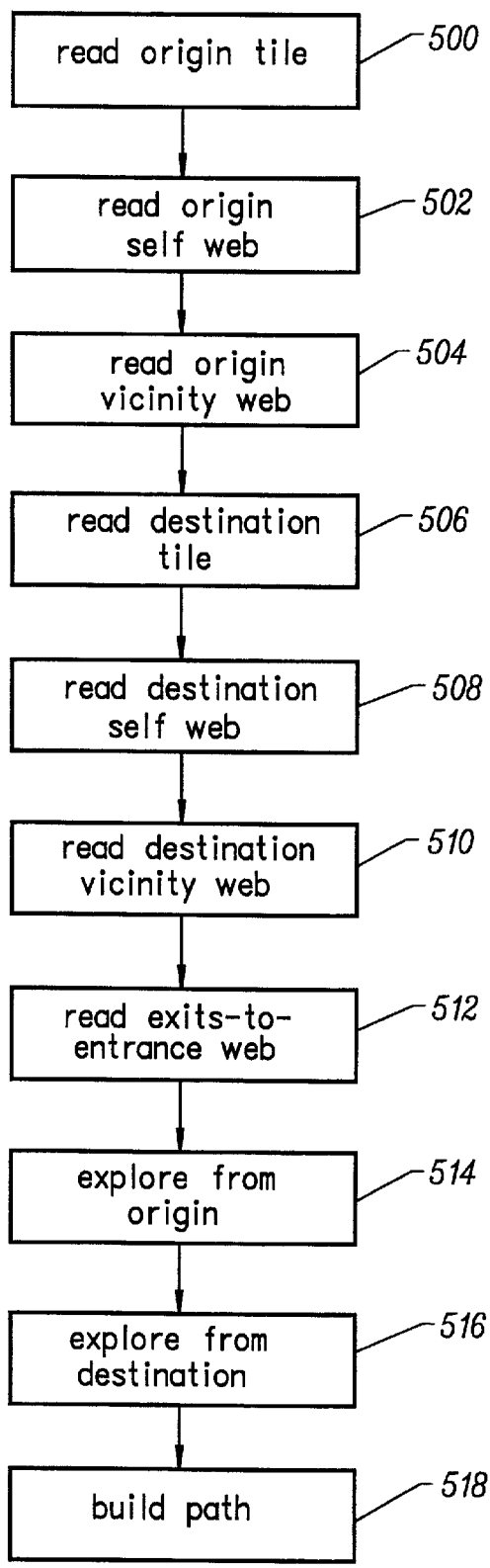
FIG. 15 is a flow chart describing step 462 of FIG. 13.

FIG. 15 is a flow chart explaining the steps for finding a path using the exit-to-entrance web (step 462 of FIG. 13). In step 500, the system reads the origin tile. In step 502, the system reads the origin self web. In step 504, the system reads the origin vicinity web. Note that the actions of steps 502 and 504 can be combined into a single step. In step 506, the system reads the destination tile. In step 508, the system reads the destination self web. In step 510, the system reads the destination vicinity web. In step 512, the system reads the appropriate exit-to-entrance web for the origin tile and the destination tile. In step 514, the system explores from the origin. In step 516, the system explores from the destination. In step 518, a path is built.

Step 514 includes a path exploration using the process of FIG. 4, an origin priority queue (and no destination priority queue), the origin tile, the origin self web and the origin vicinity web. Step 516 includes exploring from the destination using the method of FIG. 4, utilizing the destination priority queue (and no origin priority queue), the destination tile, the destination vicinity web, the destination self web and the exit-to-entrance web for the origin and destination pair. Note that the exploration of steps 514 and 516 continue until their respective priority queues are empty or enough (e.g. 10) connection nodes are found. The path built in step 518 is the path utilizing the best connection nodes as described above. Additionally, the steps of FIG. 15 can be performed in a different order; for example, steps 514 and 516 can be performed in reverse order or simultaneously. The steps of reading the data can also be performed prior to or concurrently with steps 450–454 of FIG. 13.

Figure 16:
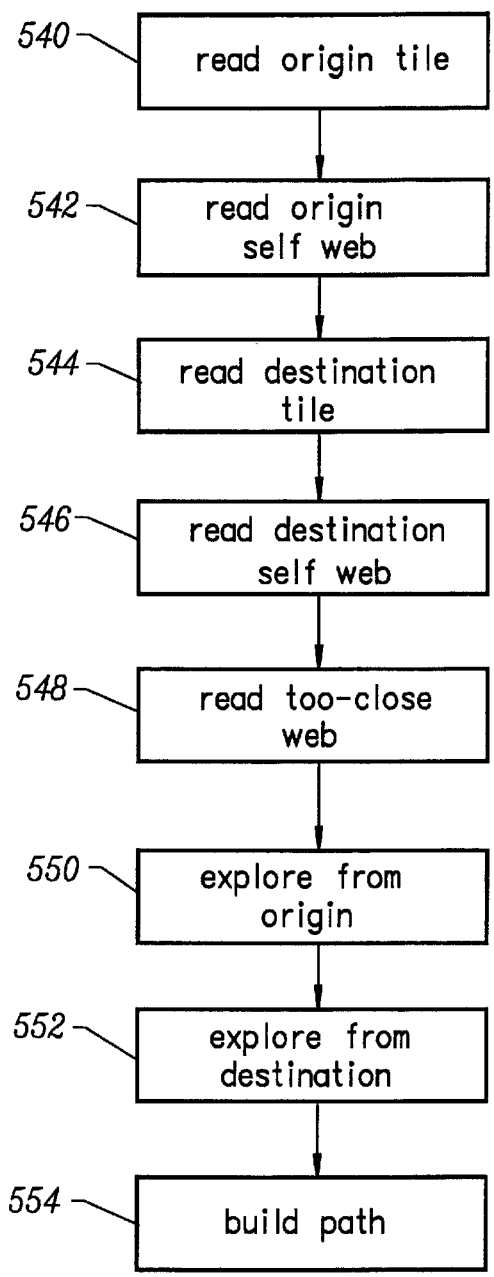
FIG. 16 is a flow chart describing step 460 of FIG. 13.

FIG. 16 is a flow chart which explains the steps of determining a path between two tiles that are within the proximity threshold (step 460 of FIG. 13). In step 540, the system reads the origin tile. In step 542, the system reads the self web for the origin tile. In step 544, the system reads destination tile. In step 546, the system reads the self web for the destination tile. In step 548, the system reads too-close web for the destination tile-origin tile pair. In step 550, the system explores from the origin. In step 552, the system explores from the destination. In step 554, a path is built.

Exploring from the origin in step 550 includes performing the process of FIG. 4 using an origin priority queue (and not a destination priority queue), the origin tile and the self web for the origin tile. The step of exploring from the destination in step 552 includes performing the process of FIG. 4 using a destination priority queue (and not the origin priority queue), the destination tile, the self web for the destination tile and the too-close web. Both explorations continue until the priority queues are empty or enough (.e.g. 10) connection nodes are found. The path built in step 554 includes traveling through the best connection node, as discussed above. Similar to the processes of FIG. 14 and FIG. 15, the steps of FIG. 16 can be performed in other appropriate orders than as depicted in the drawing.

Although the examples used above to describe the present invention were directed to an electronic map of roads, the present invention also applies to any suitable processor readable representation of a network. Suitable networks include a graph of a manufacturing process, intermodal travel plan (e.g., a graph representing travel between points via airplanes, trains, automobiles, busses, etc.), a system for providing medical treatment, etc. For example, if the network represents a manufacturing process, the nodes may represent decision points in the processes (i.e. which station to transport the article of manufacturer or which semiconductor process to use), and the links can represent process time or manufacturing costs.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for determining a path in a processor readable representation of a network from an origin to a destination, said processor readable representation of said network including one or more tiles, the method comprising the steps of:

determining whether said origin and said destination are located in a single tile;

determining whether said origin and said destination are located in tiles within a proximity threshold of each other;

performing a first path exploration with a processor to determine said path using a first set of one or more webs, if said origin and said destination are located in a single tile;

performing a second path exploration with said processor to determine said path using a second set of one or more webs, if said origin and said destination are located in tiles within said proximity threshold of each other;

performing a third path exploration with said processor to determine said path using a third set of one or more webs, if said origin and said destination are located in separate tiles not within said proximity threshold of each other; and reporting said path.

2. A method according to claim 1, further including the steps of:

receiving an indication of said origin; and receiving an indication of said destination.

3. A method according to claim 1, wherein:

said processor readable representation of a network is an electronic map.

4. A method according to claim 1, wherein:

said first path exploration uses at least an origin tile and a first self web associated with said origin tile.

5. A method according to claim 4, wherein said step of performing a first path exploration includes the steps of:

exploring from said origin inside said origin tile; and exploring from said destination within said origin tile and said first self web.

6. A method according to claim 1, wherein:

said second path exploration uses at least an origin tile, a first self web associated with said origin tile, a destination tile, a second self web associated with said destination tile and a too-close web.

7. A method according to claim 6, wherein said step of performing a second path exploration includes the steps of:

exploring from said origin using said origin tile and said first self web; and exploring from said destination using said destination tile, said second self web and said too-close web.

8. A method according to claim 1, wherein:

said third path exploration uses at least an origin tile, a first vicinity web associated with said origin tile, a destination tile, a second vicinity web associated with said destination tile and an exit-to-entrance web.

9. A method according to claim 8, wherein:

said third path exploration additionally uses a first self web associated with said origin tile and a second self web associated with said destination tile; and data for said first self web and data for said first vicinity web are combined.

10. A method according to claim 1, wherein:

said first path exploration uses at least an origin tile and a first self web associated with said origin tile;

said second path exploration uses at least an origin tile, a first self web associated with said origin tile, a destination tile, a second self web associated with said destination tile and a too-close web; and said third path exploration uses at least an origin tile, a first self web associated with said origin tile, a first vicinity web associated with said origin tile, a destination tile, a second self web associated with said destination tile, a second vicinity web associated with said destination tile and an exit-to-entrance web.

11. A method according to claim 10, further including the steps of:

receiving an indication of said origin; and receiving an indication of said destination.

12. A method according to claim 1, wherein:

said third path exploration uses an origin tile, a first self web associated with said origin tile, a first vicinity web associated with said origin tile, a destination tile, a second self web associated with said destination tile, a second vicinity web associated with said destination tile and an exit-to-entrance web.

13. A method according to claim 12, wherein:

said step of performing a third path exploration includes building said path.

14. A method according to claim 12, wherein said step of performing a third path exploration includes the steps of:

exploring from said origin using said origin tile, said first vicinity web and said first self web; and exploring from said destination using said destination tile, said second vicinity web, said second self web and said exit-to-entrance web.

15. A method according to claim 14, wherein:

said step of exploring from said destination proceeds until a priority queue is empty.

16. A method for determining a path in an electronic map of roads from an origin to a destination, said electronic map including one or more tiles, data representing said origin being part of a first tile in said electronic map, the method comprising the steps of:

reading data for at least said first tile;

determining whether said destination is in said first tile;

reading data for at least a second tile if said destination is not in said first tile;

determining whether said first tile is within a proximity threshold of said second tile, if said destination is not in said first tile;

reading data for at least an exit-to-entrance web, data for a first vicinity web and data for a second vicinity web, if said destination is not in said first tile and if said first tile is not within said proximity threshold of said second tile;

reading data for at least a first self web if said destination is in said first tile;

reading said data for at least said first self web, data for a second self web and data for a too-close web if said destination is not in said first tile and if said first tile is within said proximity threshold of said second tile;

performing one or more path explorations using a processor and at least said data read; and reporting said path.

17. A method for using a processor to determine a path in an electronic map from an origin to a destination, said electronic map including one or more tiles, the method comprising the steps of:

determining whether said origin and said destination are located in a single tile;

determining whether said origin and said destination are located in tiles within a proximity threshold of each other;

performing a path exploration to determine said path, said step of performing a path exploration uses at least an origin tile, a first vicinity web associated with said origin tile, a destination tile, a second vicinity web associated with said destination tile and an exit-to-entrance web if said origin and said destination are located in tiles not within said proximity threshold of each others, and reporting said path.

18. A method according to claim 17, wherein:

said step of performing a path exploration includes:
    determining a path from said origin to said first vicinity web;
    determining a path from said second vicinity web to said destination; and
    determining a path from said first vicinity web to said second vicinity web.

19. A method for determining a path in an electronic map from an origin to a destination, said electronic map including data divided into tiles, the method comprising:

determining whether said origin and said destination are within a first tile;

reading data for said first tile;

reading data for a first self web, said first self web being associated with said first tile;

exploring, using a processor, between said origin and said destination using said data for said first tile and said data for said self web if said origin and said destination are both within said first tile, said step of exploring determines said path from said origin to said destination; and reporting said path.

20. A method according to claim 19, further including the steps of:

receiving an indication of said origin in said electronic map; and receiving an indication of said destination in said electronic map.

21. A method according to claim 19, wherein:

said step of exploring includes a first exploration from said origin and a second exploration from said destination.

22. A method according to claim 21, wherein:

said first exploration uses said data for said first tile; and said second exploration uses said data for said first tile and said data for said first self web.

23. A processor readable storage medium having processor readable code embodied on said processor readable storage medium, said processor readable code for programming a processor to perform a method comprising the steps of:

determining whether said origin and said destination are located in a single tile;

determining whether said origin and said destination are located in tiles within a proximity threshold of each other;

performing a first path exploration to determine said path using a first set of one or more webs, if said origin and said destination are located in a single tile;

performing a second path exploration to determine said path using a second set of one or more webs, if said origin and said destination are located in tiles within said proximity threshold of each other; and performing a third path exploration to determine said path using a third set of one or more webs, if said origin and said destination are located in separate tiles not within said proximity threshold of each other.

24. A processor readable storage medium according to claim 23, wherein said method further includes the step of:

reporting said path.

25. A processor readable storage medium according to claim 23, wherein:

said second path exploration uses at least an origin tile, a first self web associated with said origin tile, a destination tile, a second self web associated with said destination tile and a too-close web.

26. A processor readable storage medium according to claim 23, wherein:

said processor readable representation of a network is an electronic map.

27. A processor readable storage medium according to claim 23, wherein:

said first path exploration uses at least an origin tile and a first self web associated with said origin tile.

28. A processor readable storage medium according to claim 27, wherein said step of performing a first path exploration includes the steps of:

exploring from said origin inside said origin tile; and exploring from said destination within said origin tile and said first self web.

29. A processor readable storage medium according to claim 23, wherein:

said third path exploration uses at least an origin tile, a first vicinity web associated with said origin tile, a destination tile, a second vicinity web associated with said destination tile and an exit-to-entrance web.

30. A processor readable storage medium according to claim 29, wherein said step of performing a third path exploration includes the steps of:

exploring from said origin using at least said origin tile and said first vicinity web; and exploring from said destination using at least said destination tile, said second vicinity web and said exit-to-entrance web.

31. A processor readable storage medium having processor readable code embodied on said processor readable storage medium, said processor readable code for programming a processor to perform a method for determining a path in an electronic map from an origin to a destination, said electronic map including a plurality of tiles, the method comprising the steps of:

determining whether said origin and said destination are located in a single tile;

determining whether said origin and said destination are located in tiles within a proximity threshold of each other;

performing a path exploration to determine said path, said step of performing a path exploration uses at least an origin tile, a first vicinity web associated with said origin tile, a destination tile, a second vicinity web associated with said destination tile and an exit-to-entrance web if said origin and said destination are located in tiles not within said proximity threshold of each other, and reporting said path.

32. An apparatus for determining a path in an electronic map from an origin to a destination, said electronic map including one or more tiles, comprising an output device;

a processor, in communication with said output device; and a processor readable storage medium for storing code, said processor readable storage medium being in communication with said processor, said code capable of programming said processor to perform the steps of:

determining whether said origin and said destination are located in a single tile, determining whether said origin and said destination are located in tiles within a proximity threshold of each other, performing a first path exploration to determine said path using a first set of one or more webs, if said origin and said destination are located in a single tile, performing a second path exploration to determine said path using a second set of one or more webs, if said origin and said destination are located in tiles within said proximity threshold of each other, performing a third path exploration to determine said path using a third set of one or more webs, if said origin and said destination are located in separate tiles not within said proximity threshold of each other, and reporting said path.

33. An apparatus according to claim 32, wherein:

said first path exploration uses at least an origin tile and a first self web associated with said origin tile.

34. An apparatus according to claim 32, wherein:

said second path exploration uses at least an origin file, a first self web associated with said origin tile, a destination tile, a second self web associated with said destination tile and a too-close web.

35. An apparatus according to claim 32, wherein:

said third path exploration uses at least an origin tile, a first vicinity web associated with said origin tile, a destination tile, a second vicinity web associated with said destination tile and an exit-to-entrance web.

36. A method for using a processor to determine a path in an electronic map from an origin to a destination, said electronic map including one or more tiles, the method comprising the steps of:

determining whether said origin and said destination are located in tiles within a proximity threshold of each other;

performing a path exploration to determine said path using at least an origin tile, a too-close web and a destination tile if said origin and said destination are located in tiles within said proximity threshold of each other; and reporting said path.

37. A method according to claim 36, wherein:

said step of performing a path exploration additionally uses a first self web associated with said origin tile and a second self web associated with said destination tile; and said step of performing a path exploration includes the steps of:

exploring from said origin using said origin tile and said first self web, and exploring from said destination using said destination tile, said second self web and said too-close web.

38. A method for using a processor to determine a path in an electronic map from an origin to a destination, said electronic map including one or more tiles, the method comprising the steps of:

reading data for at least a first tile, a first web of pre-computed paths and a second web of pre-computed paths, said origin being in said first tile;

performing a pathfinding exploration to find said path from said origin to said destination, said path traverses in said first tile, said first web and said second web; and reporting said path.

39. A method for using a processor to determine a path in an electronic map from an origin to a destination, the method comprising the steps of:

reading data for a first region of said electronic map, said first region including said origin;

reading data for a second region of said electronic map, said second region including said destination;

reading data for a first set of pre-computed paths, said first set of pre-computed paths comprises pre-computed paths within a vicinity of said first region;

reading data for a second set of pre-computed paths, said second set of pre-computed paths comprises pre-computed paths between said first region and said second region;

performing a pathfinding exploration to determine said path from said origin to said destination using said data for said first region, said data for said second region, said data for said first set of pre-computed paths and said data for said second set of pre-computed paths; and reporting said path.

40. A method according to claim 39, further including the step of:

reading data for a third set of pre-computed paths, said second set of pre-computed paths comprises pre-computed paths within a vicinity of said second region, said step of performing a pathfinding exploration uses said data for said third set of pre-computed paths.

41. A method according to claim 40, wherein:

said first region is a first tile;

said second region is a second tile;

said first set of pre-computed paths is a first vicinity web associated with said first tile;

said second set of pre-computed paths is a second vicinity web associated with said second tile; and said third set of pre-computed paths is an exit-to-entrance web.

42. A method for using a processor to determine a path in an electronic map from an origin to a destination, the method comprising the steps of:

reading data for a first region of said electronic map, said first region including said origin;

reading data for a second region of said electronic map, said second region including said destination;

reading data for a first set of pre-computed paths, said first set of pre-computed paths comprises pre-computed paths within a vicinity of said second region;

reading data for a second set of pre-computed paths, said second set of pre-computed paths comprises pre-computed paths between said first region and said second region;

performing a pathfinding exploration to determine said path from said origin to said destination using said data for said first region, said data for said second region, said data for said first set of pre-computed paths and said data for said second set of pre-computed paths; and reporting said path.

43. A method for using a processor to determine a path in an electronic map from an origin to a destination, the method comprising the steps of:

determining whether said origin and said destination are located within a proximity of each other;

performing a first path exploration to determine said path using a first set of one or more webs, if said origin and said destination are located within said proximity of each other;

performing a second path exploration to determine said path using a second set of one or more webs, if said origin and said destination are not located within said proximity of each other; and reporting said path.

44. A method according to claim 43, wherein:

said first set of one or more webs includes a self web if said origin and said destination are in a single tile.

45. A method according to claim 43, wherein:

said first path exploration is only performed if said origin and said destination are located within said proximity of each other and said origin and said destination are not in a single tile; and said method further includes the step of performing a third path exploration to determine said path using a third set of one or more webs, if said origin and said destination are located in a single tile.

46. A method according to claim 43, wherein:

said first path exploration is only performed if said origin and said destination are located within a single tile.

47. A method according to claim 43, wherein:

said first set of one or more webs includes a too-close web if said origin and said destination are not in a single tile.

48. A method for using a processor to determine a path in an electronic map from an origin to a destination, said electronic map including data divided into tiles, the method comprising the steps of:

determining whether said origin and said destination are within a proximity threshold of each other;

reading data for said first tile, said first tile includes said origin;

reading data for said second tile, said second tile includes said destination;

reading data for a too-close web associated with said first tile;

determining said path between said origin and said destination using said data for said first tile, said data for said second tile and said data for said too-close web if said origin and said destination are within a proximity threshold of each other; and reporting said path.

49. A method according to claim 48, further including the steps of:

reading data for a first self web associated with said first tile;

reading data for a second self web associated with said second tile, said step of determining uses said data for said first self web and said data for said second self web.

* * * * *